United States Patent
Ozawa et al.

(10) Patent No.: US 9,266,262 B2
(45) Date of Patent: Feb. 23, 2016

(54) METHOD FOR MANUFACTURING LIGHT TRANSMISSIVE FILM, ACTIVE ENERGY RAY-CURABLE COMPOSITION, AND LIGHT TRANSMISSIVE FILM

(75) Inventors: Satoru Ozawa, Otake (JP); Katsuhiro Kojima, Otake (JP); Yusuke Nakai, Otake (JP); Hiroshi Onomoto, Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 100 days.

(21) Appl. No.: 13/976,193

(22) PCT Filed: Dec. 28, 2011

(86) PCT No.: PCT/JP2011/080489
§ 371 (c)(1),
(2), (4) Date: Jun. 26, 2013

(87) PCT Pub. No.: WO2012/091129
PCT Pub. Date: Jul. 5, 2012

(65) Prior Publication Data
US 2013/0277881 A1    Oct. 24, 2013

(30) Foreign Application Priority Data

Dec. 28, 2010 (JP) ................. 2010-293187
Aug. 3, 2011 (JP) ................. 2011-170065

(51) Int. Cl.
| | |
|---|---|
| *C07F 9/02* | (2006.01) |
| *B29C 43/00* | (2006.01) |
| *B29C 39/14* | (2006.01) |
| *B29C 33/60* | (2006.01) |
| *C08K 5/521* | (2006.01) |
| *B29C 43/28* | (2006.01) |
| *B29C 59/04* | (2006.01) |
| *B29C 39/18* | (2006.01) |

(52) U.S. Cl.
CPC .............. *B29C 43/003* (2013.01); *B29C 33/60* (2013.01); *B29C 39/148* (2013.01); *B29C 43/28* (2013.01); *B29C 59/04* (2013.01); *C08K 5/521* (2013.01); *B29C 39/18* (2013.01)

(58) Field of Classification Search
CPC .............. C07F 9/02; C07F 9/06; C07F 9/062; C07F 9/09; C07F 9/141
USPC .................................. 510/188, 271
See application file for complete search history.

(56) References Cited

U.S. PATENT DOCUMENTS

| | | | |
|---|---|---|---|
| 2004/0059013 A1 | 3/2004 | Tanabe et al. | |
| 2009/0124525 A1* | 5/2009 | Futterer et al. | ............... 510/180 |

FOREIGN PATENT DOCUMENTS

| | | |
|---|---|---|
| EP | 2 210 970 A1 | 7/2010 |
| JP | 2007-277454 A | 10/2007 |
| JP | 2007-291339 A | 11/2007 |
| JP | 2007-326367 A | 12/2007 |
| JP | 2009-061628 A | 3/2009 |
| JP | 2010-005841 A | 1/2010 |
| JP | 2010-201641 A | 9/2010 |
| JP | 2010-257521 A | 11/2010 |
| WO | 02/070233 A1 | 9/2002 |
| WO | 2011/118734 A1 | 9/2011 |

OTHER PUBLICATIONS

Extended European Search Report dated Oct. 2, 2013 for Application No. 11853080.7.
International Search Report dated Apr. 3, 2012 for International application No. PCT/JP2011/080489.
Office Action issued in corresponding Japanese Patent Application No. 2012-143219 dated Oct. 6, 2015.

* cited by examiner

*Primary Examiner* — Edward Cain
(74) *Attorney, Agent, or Firm* — Morgan, Lewis & Bockius LLP

(57) ABSTRACT

A method for manufacturing a light transmissive film having a cured resin layer with a fine concavo-convex structure on a surface of a base material film is provided. The method includes sandwiching an active energy ray-curable composition including a mold dissolving component between a mold having an inversion structure of the fine concavo-convex structure and the base material film, obtaining a light transmissive film in which a cured resin layer having the inversion structure of the mold transferred is formed on one surface of the base material film, and separating the obtained light transmissive film and the mold. Thus, it is possible to productively manufacture a light transmissive film, and to prevent the deposition of an attachment on the mold surface and the contamination of the mold surface. Moreover, a light transmissive film can be manufactured having excellent performances, such as antireflection properties.

11 Claims, 5 Drawing Sheets

METHOD FOR MANUFACTURING LIGHT TRANSMISSIVE FILM, ACTIVE ENERGY RAY-CURABLE COMPOSITION, AND LIGHT TRANSMISSIVE FILM

TECHNICAL FIELD

The present invention relates to a method for manufacturing a light transmissive film having a fine concavo-convex structure on a surface, an active energy ray-curable composition, and a light transmissive film.

Priority is claimed on Japanese Patent Application No. 2010-293187, filed Dec. 28, 2010, and Japanese Patent Application No. 2011-170065, filed Aug. 3, 2011, the contents of which are incorporated herein by reference.

BACKGROUND ART

In recent years, it has been known that articles, such as light transmissive films having a fine concavo-convex structure with a cycle of the wavelength or less of visible light on the surface thereof, exhibit an antireflection effect, the Lotus effect and the like. Particularly, it is known that a concavo-convex structure called a moth-eye structure can serve as effective means for antireflection due to the refractive index continuously increasing from the refractive index of air to the refractive index of a material of the articles.

As a method for manufacturing a light transmissive film having a fine concavo-convex structure on the surface thereof, for example, a method having the following steps (i) to (iii) (nanoimprint) is known.

(i) A step of sandwiching an active energy ray-curable composition between a mold having an inversion structure of a fine concavo-convex structure on the surface and a base material film which serves as a main body of a light transmissive film.

(ii) A step of irradiating the active energy ray-curing composition with active energy rays, such as ultraviolet rays, curing the active energy ray-curable composition so as to form a cured resin layer having a fine concavo-convex structure, and obtaining a light transmissive film.

(iii) A step of separating the light transmissive film and the mold.

Meanwhile, in the mold, generally, since the cycle of fine pores is on the nanometer order, and the aspect ratio of the fine pores is also relatively large, the contact interface between the mold and the active energy ray-curable composition significantly increases. Therefore, there is a problem in that it is difficult to release the mold from the cured resin layer. Therefore, in particular, the above step (iii) is considered to be important from the viewpoint of productivity.

As a method for improving the release property between the mold and the cured resin layer, the following method has been proposed.

(1) A method in which the fine concavo-convex structure-formed surface of a mold is treated using a release agent (external release agent) (Patent Literature 1).

(2) A method in which a solid-form photo-curable transfer layer made of a photo-curable resin composition including a phosphate ester-based compound as an internal release agent (Patent Literature 2).

CITATION LIST

Patent Literature

[Patent Literature 1] Japanese Unexamined Patent Application, First Publication No. 2007-326367

[Patent Literature 2] Japanese Unexamined Patent Application, First Publication No. 2009-61628

SUMMARY OF INVENTION

Technical Problem

However, in the method (1), in a case in which the fine concavo-convex structure of the mold is repeatedly transferred, the external release agent used to treat the mold surface is peeled off, and therefore the release property gradually degrades. When the release property of the mold surface degrades, there is a problem in that the productivity of the light transmissive film degrades.

In the method (2), in a case in which the fine concavo-convex structure of the mold is repeatedly transferred, the internal release agent is deposited on the mold surface, and therefore the mold surface is gradually contaminated. As a result, there is a problem in that the predetermined fine concavo-convex structure is not transferred, the contaminants of the mold surface is transferred as a pattern, and the performances, such as antireflection properties, of the light transmissive film degrade.

An object of the invention is to provide an active energy ray-curable composition which can prevent the contamination of the mold surface, and can maintain the release property between the mold and the cured resin layer for a long period of time, and a method for productively manufacturing a light transmissive film having a fine concavo-convex structure on the surface.

Furthermore, another object of the invention is to provide a light transmissive film having excellent antireflection properties even in a case in which the light transmissive film is continuously produced.

Solution to Problem

As a result of thorough studies, the present inventors found that, if a mold dissolving component or the like, such as a phosphate ester compound including phosphoric acid that appropriately dissolves the mold surface, is blended into an active energy ray-curable composition so as to extremely slightly dissolve the mold surface while transferring the concavo-convex structure, the deposition of the mold dissolving component, the active energy ray-curable composition including the mold dissolving component, cured substances of the active energy ray-curable composition on the mold surface is suppressed, and a light transmissive film having excellent antireflection properties can be obtained even in a case in which the light transmissive film is continuously produced. In addition, as an index of solubility required dissolving the mold surface appropriately, the inventors paid attention to the reduction rate of the mold mass when the mold was immersed in the phosphate ester compound including phosphoric acid or the atomic percentage of phosphorous atoms on the surface of the light transmissive film, and completed the invention.

That is, a first aspect of the invention has the following characteristics.

[1] A method for manufacturing a light transmissive film in which a cured resin layer having a fine concavo-convex structure is formed on a surface of a base material film, including a step of sandwiching an active energy ray-curable composition including a mold dissolving component between a mold having an inversion structure of the fine concavo-convex structure and the base material film (sandwiching step), a step of obtaining a light transmissive film in which a cured resin layer having the inversion structure of the mold transferred thereto, is formed on one surface of the base material film (transferring step), and a step of separating the obtained light transmissive film and the mold (separating step).

[2] The method for manufacturing a light transmissive film according to the above [1], in which the mold dissolving component is a phosphate ester compound which includes phosphoric acid and satisfies the following condition (a);

Condition (a): When the mold is immersed in the phosphate ester compound including phosphoric acid at 50° C. for 22 hours, the mold mass reduces by 0.001% to 3% compared to before immersion.

[3] The method for manufacturing a light transmissive film according to the above [1] or [2], in which the mold dissolving component is a phosphate ester compound which includes phosphoric acid and satisfies the following conditions (b-1) and (c-1);

Condition (b-1): A pH of an aqueous solution obtained by extracting the phosphate ester compound including phosphoric acid using 50 mL of water per gram thereof is less than 6.5 at 25° C.;

Condition (c-1): A value represented by (the concentration of phosphoric acid in the aqueous solution expressed by parts per million parts by mass)×(the content of the mold dissolving component in the active energy ray-curable composition expressed by mass percentage) is 0.1 or more.

[4] The method for manufacturing a light transmissive film according to the above [2] or [3], in which the phosphate ester compound is a polyoxyethylene alkyl phosphate ester compound represented by the following formula (1).

[Chemical Formula 1]

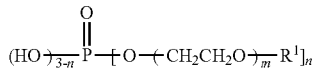

(1)

[In the formula (1), $R^1$ represents an alkyl group, m represents an integer of 1 to 20, and n represents an integer of 1 to 3.]

[5] The method for manufacturing a light transmissive film according to any one of the above [1] to [4], in which the inversion structure of the fine concavo-convex structure on the mold surface is formed from anodized alumina.

[6] The method for manufacturing a light transmissive film according to any one of the above [1] to [5], in which the mold dissolving component is a phosphate ester compound which include phosphoric acid and satisfies the following conditions (b-2) and (c-2);

Condition (b-2): A pH of an aqueous solution obtained by extracting the phosphate ester compound including phosphoric acid using 50 mL of water per gram thereof is 2.6 or more at 25° C.;

Condition (c-2): A value represented by (the concentration of phosphoric acid in the aqueous solution expressed by parts per million parts by mass)×(the content of the mold dissolving component in the active energy ray-curable composition expressed by mass percentage) is 23 or less.

A second aspect of the invention has the following characteristics.

[7] An active energy ray-curable composition used when an active energy ray-curable composition is sandwiched between a mold having an inversion structure of a fine concavo-convex structure on a surface and a base material film, the active energy ray-curable resin composition is irradiated with active energy rays and thus cured, thereby forming a cured resin layer having an inversion structure of the mold transferred thereto, is formed on a surface of the base material film, including a mold dissolving component.

[8] The active energy ray-curable composition according to the above [7], in which the mold dissolving component is a phosphate ester compound which includes phosphoric acid and satisfies the following condition (a);

Condition (a): When the mold is immersed in the phosphate ester compound including phosphoric acid at 50° C. for 22 hours, the mold mass reduces by 0.001% to 3% compared to before immersion.

[9] The active energy ray-curable composition according to the above [7] or [8], in which the mold dissolving component is a phosphate ester compound which includes phosphoric acid and satisfies the following conditions (b-1) and (c-1);

Condition (b-1): The pH of an aqueous solution obtained by extracting the phosphate ester compound including phosphoric acid using 50 mL of water per gram thereof is less than 6.5 at 25° C.;

Condition (c-1): A value represented by (the concentration of phosphoric acid in the aqueous solution expressed by parts per million parts by mass)×(the content of the mold dissolving component in the active energy ray-curable composition expressed by mass percentage) is 0.1 or more.

[10] The active energy ray-curable composition according to the above [8] or [9], in which the phosphate ester compound is a polyoxyethylene alkyl phosphate ester compound represented by the following formula (1);

[Chemical Formula 2]

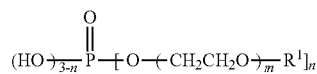

(1)

[In the formula (1), $R^1$ represents an alkyl group, m represents an integer of 1 to 20, and n represents an integer of 1 to 3.]

[11] The active energy ray-curable composition according to the above [7] to [10], in which the mold dissolving component is a phosphate ester compound which includes phosphoric acid and satisfies the following conditions (b-2) and (c-2);

Condition (b-2): A pH of an aqueous solution obtained by extracting the phosphate ester compound including phosphoric acid using 50 mL of water per gram thereof is 2.6 or more at 25° C.;

Condition (c-2): A value represented by (the concentration of phosphoric acid in the aqueous solution expressed by parts per million parts by mass)×(the content of the mold dissolving component in the active energy ray-curable composition expressed by mass percentage) is 23 or less.

[12] The active energy ray-curable composition according to the above [7], in which a transmittance at 500 nm is 50% to 100% when 3 parts by mass of the phosphate ester compound including phosphoric acid is dissolved in 100 parts by mass of a polymerizable compound in the active energy ray-curable composition.

A third aspect of the invention has the following characteristics.

[13] A light transmissive film in which a cured resin layer having a fine concavo-convex structure is formed on a surface of a base material film, in which the fine concavo-convex structure is formed by transferring a fine concavo-convex structure of the surface of a mold using a nanoimprint method, and a height of the fine concavo-convex structure is uniform in a longitudinal direction of the film.

[14] The light transmissive film according to the above [13] in which a fine concavo-convex structure is formed on a surface by polymerizing and curing an active energy ray-curable composition including a phosphate ester compound which includes phosphoric acid and satisfies the following condition (a), wherein an atomic percentage of phosphorous atoms on the surface of the light transmissive film, which is measured using X-ray photoelectron spectroscopy, is 0.001% to 0.14%;

Condition (a): When the mold is immersed in the phosphate ester compound including phosphoric acid at 50° C. for 22 hours, the mold mass reduces by 0.001% to 3% compared to before immersion.

Advantageous Effects of Invention

According to the method for manufacturing a light transmissive film, which is the first aspect of the invention, it is possible to productively manufacture a light transmissive film, and to prevent the deposition of an attachment on the mold surface and the contamination of the mold surface.

Therefore, it is possible to manufacture a light transmissive film having excellent performances, such as antireflection properties.

According to the active energy ray-curable composition, which is the second aspect of the invention, it is possible to prevent the contamination of the mold surface and to maintain the release property between the mold and the cured resin layer for a long period of time.

According to the light transmissive film, which is the third aspect of the invention, the light transmissive film is excellent in terms of antireflection properties even in a case in which the light transmissive film is continuously produced.

DESCRIPTION OF EMBODIMENTS

Figure 1:
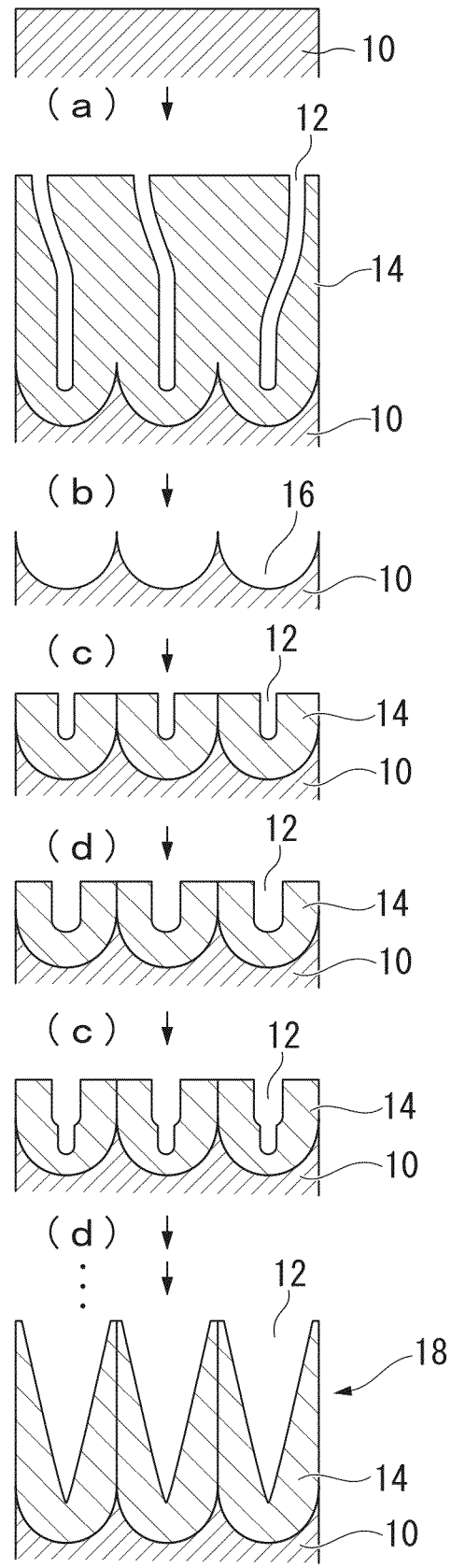
FIG. 1 is a cross-sectional view illustrating a step of manufacturing a mold having anodized alumina on the surface thereof.

Hereinafter, the invention will be described in detail.

Meanwhile, in the specification, "(meth)acrylate" refers to acrylate and methacrylate, "light transmissive" refers to a property of transmission of light having a wavelength of at least 400 nm to 1170 nm, and "active energy rays" refers to visible light rays, ultraviolet rays, electronic rays, plasma, heat rays (infrared rays and the like) and the like. Here, "transmission" refers to a state in which the reflection of light is little and an object behind the transmissive article is clearly visible.

[Light Transmissive Film]

The light transmissive film of the invention has a fine concavo-convex structure, which is formed by polymerizing and curing an active energy ray-curable composition, and is formed by transferring a fine concavo-convex structure of the surface of a mold, on the surface thereof.

Here, the active energy ray-curable composition used in the invention will be described.

<Active Energy Ray-Curable Composition>

The active energy ray-curable composition (hereinafter, referred to simply as "curable composition") contains a polymerizable compound, a polymerization initiator, and a mold dissolving component such as a phosphate ester compound including phosphoric acid. In the present specification, the curable composition refers to a composition cured by heat and/or light.

(Mold Dissolving Component)

In the specification, the mold dissolving component refers to a component that can supply an appropriate dissolving property with respect to a mold and excellent release properties to the curable composition.

When the curable composition in the second aspect of the invention contains the mold dissolving component, the mold dissolving component plays a role as an internal release agent, and the release properties between a cured resin layer, which is a cured substance of the curable composition, and the mold can be maintained for a long period of time.

Additionally, since a mold surface is renewed due to not only the internal release agent but also a mold dissolving effect, it is possible to prevent the deposition of the internal release agent or a cured resin layer, which is a cured substance of the internal release agent, (hereinafter, collectively referred to as "attachment") on the mold surface, and the contamination of the mold surface.

Meanwhile, since the mold surface is dissolved by the mold dissolving component, the fine concavo-convex structure of the mold is gradually changed. Therefore, in a case in which the transferred fine concavo-convex structure on the surface of the light transmissive film also changes, and the change amount is large, there are cases in which the characteristics of the light transmissive film are influenced. For example, problems, such as a decrease in the height of the fine concavo-convex structure and an increase in the reflection rate, occur. Therefore, it is preferable to set the dissolution amount of the mold in an appropriate range and to prevent changes in the characteristics of the obtained light transmissive film as much as possible from the viewpoint of productivity. In a case in which the light transmissive film is used as an antireflection film, it can be said that the reflection rate at a wavelength of 550 nm is preferably 0.2% or less in all portions of manufactured film (even in distanced portions), and, in this case, the height of the fine concavo-convex structure in the longitudinal direction is uniform.

The reason for the above will be described using a mold having a fine concavo-convex structure made of anodized alumina on the surface thereof as an example.

It is known that alumina dissolves in an acid or an alkali, and, among the above, phosphoric acid has a high level of dissolving property (Non-Patent Literature (Heating, Air-Conditioning and Sanitary Engineers, Vol. 79, Issue. 9, p. 70)).

If the mold surface is dissolved, even when the attachment is attached to the mold surface, the surface is dissolved and a new surface appears (the surface is renewed) each time. Therefore, the deposition of the attachment on the mold surface is suppressed, and the contamination of the mold surface can be prevented.

Therefore, in the invention, the curable composition is contained in a mold dissolving component.

The mold dissolving component is not particularly limited as long as the component can dissolve the mold; however, in a case in which the mold is made of alumina, phosphoric acid is preferable. Phosphoric acid may be directly added to the curable composition, but there is a concern that it may be difficult to uniformly dissolve phosphoric acid in the curable composition, or the addition of phosphoric acid may incorporate water into the curable composition.

Therefore, in a stage of preparing the curable composition, a phosphate ester compound including phosphoric acid as the mold dissolving component is preferably mixed with other components (a polymerizable compound, a polymerization initiator and the like described below).

Hereinafter, a case in which a phosphate ester compound including phosphoric acid is used as the mold dissolving component will be described in detail.

Meanwhile, when the dissolving property of the phosphate ester compound including phosphoric acid with respect to the mold is too high, the mold surface is excessively dissolved, and the fine concavo-convex structure on the mold surface significantly changes.

As a result, the fine concavo-convex structure of the light transmissive film manufactured using the above mold also changes, and therefore the performances, such as antireflection properties, become likely to degrade.

Therefore, the phosphate ester compound including phosphoric acid needs to have an appropriate level of dissolving property, with which the mold is not excessively dissolved.

Meanwhile, the dissolving property of the phosphate ester compound including phosphoric acid with respect to the mold has an influence on the pH of the curable composition including the phosphate ester compound including phosphoric acid and the content of phosphoric acid in the curable composition. However, it is difficult to directly measure the pH or the content of phosphoric acid.

Therefore, as a result of thorough studies, the inventors found that, when the pH of an aqueous solution extracted by a water extraction test of the mold dissolving component, which is a phosphate ester compound including phosphoric acid, described below, and the content of phosphoric acid in the curable composition, which is calculated from the concentration of phosphoric acid in the aqueous solution, are regulated, an appropriate dissolving property of the phosphate ester compound including phosphoric acid, with which the mold surface can be renewed by extremely slightly dissolving the mold surface with no substantial change in the fine concavo-convex structure on the mold surface, is developed, and the contamination of the mold surface is suppressed.

That is, in the mold dissolving component including the phosphate ester compound including phosphoric acid, which is used in the invention, the pH of the aqueous solution extracted using 50 mL of water per gram of the mold dissolving component at 25° C. is less than 6.5, the pH of the aqueous solution at 25° C. is more preferably 2.6 to less than 6.5, and still more preferably 3.0 to 6.0.

In addition, the value represented by (the concentration of phosphoric acid in the aqueous solution expressed by parts per million parts by mass)×(the content of the mold dissolving component in the active energy ray-curable composition expressed by mass percentage) is 0.1 or more, the content is preferably 0.1 to 39, and more preferably 0.3 to 23.

Hereinafter, a specific water extraction test will be described.

First, the mold dissolving component is dissolved in an organic solvent, which dissolves the mold dissolving component, but does not dissolve in water, in a proportion of 50 mL of the organic solvent per gram of the mold dissolving component, and then 50 mL of water per gram of the mold dissolving component is added to the above solution, thereby preparing a liquid mixture.

Meanwhile, a problem may occur in the subsequent analysis when the amount of water added at this time is both too large and too small.

Next, the liquid mixture is violently stirred using a separating funnel or the like, and then standed.

In addition, the liquid mixture is divided into two layers of an organic layer and a water layer (aqueous solution), then, the aqueous solution is collected, and the pH and the concentration of phosphoric acid in the aqueous solution are measured.

Examples of the organic solvent include chloroform, diethyl ether, hexane and the like.

The pH of the aqueous solution can be measured by a pH tester.

The pH of the aqueous solution at 25° C. is less than 6.5, preferably 2.6 to less than 6.5, and still more preferably 3.0 to 6.0.

When the pH of the aqueous solution is less than 2.6, which means that the acid is too strong, the dissolution rate of the mold becomes fast, and the fine relief shape of the mold changes in an early stage, and hence, the mold becomes useless, which indicates that there is a tendency for the control of the dissolution rate to become difficult.

Meanwhile, when the pH of the aqueous solution is 6.5 or more, which means that the aqueous solution is neutral or alkaline, particularly in a case in which the aqueous solution is neutral, the dissolving property with respect to the mold is poor, it becomes difficult to renew the mold surface, and it is difficult to obtain a contamination prevention effect of the mold surface.

As the degree of appropriate dissolution, at which the surface can be renewed by extremely slightly dissolving the mold surface, the reduction rate of the mass of the mold is preferably 0.001% to 3%, and more preferably 0.01% to 1%.

When the reduction rate is 0.001% or more, an effect of renewing the mold surface through the dissolution of the mold surface can be expected, and, when the reduction rate is 3% or less, there is a low possibility of extreme dissolution. Particularly, when the reduction rate is 0.01% to 1%, it is easy to control the dissolution.

Here, the reduction rate of the mass of the mold is computed using the following formula.

Reduction rate (%)={(the mass of the mold before immersion−the mass of the mold after cleansing)/the mass of the mold before immersion}×100

In addition, when the above pH of the aqueous solution is in the above range, particularly in a case in which phosphate ester described below is used, the stability can be favorably maintained.

Meanwhile, the concentration of phosphoric acid in the aqueous solution can be obtained through measurement using a titration method or ion chromatography.

Meanwhile, the content of phosphoric acid in the curable composition is also dependent on the content of the mold dissolving component in 100 mass % of the curable composition.

Therefore, the content of phosphoric acid in the curable composition is regulated using the concentration of phosphoric acid in the aqueous solution and the content of the mold dissolving component in the curable composition.

That is, the content of phosphoric acid in the curable composition is expressed by the product of the concentration of phosphoric acid in the aqueous solution, which is expressed by parts per million parts by mass, and the content of the mold dissolving component in the curable composition, which is expressed by mass percentage, (the concentration of phosphoric acid×the content of the mold dissolving component), is preferably 0.1 or more, more preferably 0.1 to 39, and still more preferably 0.3 to 23.

When the content of the phosphoric acid is less than 0.1, the dissolving property with respect to the mold is poor, it becomes difficult to renew the mold surface, and it is difficult to obtain a contamination prevention effect of the mold surface.

On the other hand, the upper limit is not particularly limited; however, when this value exceeds 23, since there is a possibility that the dissolution rate of the mold becomes fast, the fine relief shape of the mold changes in an early stage, and the mold becomes useless, the control of the dissolution rate becomes difficult.

Meanwhile, whether or not the mold dissolving component dissolves the mold can be determined by immersing the mold in the constituent components of the curable composition.

Specifically, whether or not the mold dissolving component dissolves the mold is determined by immersing the mold in the mold dissolving component, and investigating a change in the mass of the mold before and after immersion, observing the cross-section of the mold surface after immersion, analyzing the composition of the mold surface after immersion, analyzing the composition of the mold dissolving component after immersion, or the like.

In a case in which the mold dissolving component is a liquid, the mold may be immersed in the mold dissolving component as it is.

Meanwhile, in a case in which the mold dissolving component is a solid, the mold dissolving component is subjected to heating or pressure reduction so as to convert into a liquid, or the mold dissolving component is dissolved in a solvent having no influence on the mold so as to form a solution, and then the mold is immersed in the above liquid or solution.

Particularly, in a case in which the mold dissolving component is dissolved in a solvent, the dissolving property of the mold dissolving component with respect to the mold can be rapidly determined when the concentration of the mold dissolving component is as high as possible.

The above mold dissolving component is not particularly limited as long as the pH of the aqueous solution obtained by the extraction test and the content of phosphoric acid in the curable composition, which is calculated from the concentration of phosphoric acid in the aqueous solution, satisfy the above ranges, and the mold dissolving component dissolves in the curable composition, but a phosphate ester compound including phosphoric acid is preferable.

In the phosphate ester compound, phosphoric acid remains in the manufacturing process, and this remaining phosphoric acid exhibits a function of a component that dissolves the mold.

In addition, since the phosphate ester compound is preferable as the internal release agent, it is possible to supply not only an appropriate dissolving property with respect to the mold but also excellent release properties to the curable composition.

Therefore, the release properties between the cured resin layer, which is a cured substance of the curable composition, and the mold becomes favorable.

(Phosphate Ester Compound)

Subsequently, the phosphate ester compound will be more specifically described.

The phosphate ester compound including phosphoric acid plays a role of appropriately dissolving the mold surface so as to renew the mold surface. Other functions of the phosphate ester compound including phosphoric acid are not particularly limited, but the phosphate ester compound including phosphoric acid is also preferable as an internal release agent, and therefore not only an appropriate dissolving property with respect to the mold but also excellent release properties can be supplied to the curable composition. Therefore, the release properties between the cured resin layer, which is a cured substance of the curable composition, and the mold becomes favorable.

Since the dissolving property with respect to the mold is influenced by the amount of phosphoric acid included in the phosphate ester compound and the like, a method of determining the dissolving property by actually immersing the mold in the phosphate ester compound including phosphoric acid, and investigating a change in the mass is appropriate.

In the invention, as the phosphate ester compound including phosphoric acid, a phosphate ester compound including phosphoric acid, which satisfies the following condition (a), is preferably used.

Condition (a): When the mold is immersed in the phosphate ester compound including phosphoric acid at 50° C. for 22 hours, the mold mass reduces by 0.001% to 3% compared to before immersion.

Whether or not the condition (a) is satisfied can be determined by the following manner.

That is, an immersion test is carried out by immersing the mold in the phosphate ester compound including phosphoric acid at 50° C. for 22 hours, then, the mold is taken out and cleansed, the masses of the mold before the immersion test and after the cleansing are measured, and a reduction rate is obtained using the following formula. When the reduction rate is 0.001% to 3%, it is determined that the condition (a) is satisfied.

Reduction rate (%)={(the mass of the mold before immersion−the mass of the mold after cleansing)/the mass of the mold before immersion}×100

When the reduction rate is 0.001% or more, since the phosphate ester compound including phosphoric acid has an appropriate dissolving property, the mold surface is renewed so that the deposition of the attachment on the mold surface is suppressed, it is possible to prevent the contamination of the mold surface, and the release properties can be favorably maintained. Therefore, even in a case in which light transmissive film is continuously produced, only a predetermined fine concavo-convex structure is transferred, and therefore a light transmissive film having excellent antireflection properties can be obtained. The reduction rate is preferably 0.01% or more.

On the other hand, the upper limit value of the reduction rate is preferably 3% or less, and more preferably 1% or less from the viewpoint of suppressing the excessive dissolution of the mold surface.

That is, the reduction rate is preferably 0.001% to 3%, and more preferably 0.01% to 1%.

Meanwhile, in a case in which the phosphate ester compound including phosphoric acid is a liquid, the mold may be immersed in the phosphate ester compound as it is. Meanwhile, in a case in which the phosphate ester compound including phosphoric acid is a solid, the phosphate ester compound including phosphoric acid is subjected to heating or pressure reduction so as to convert into a liquid, or the phosphate ester compound including phosphoric acid is dissolved in a solvent having no influence on the mold so as to form a solution, and then the mold is immersed in the above liquid or solution. Particularly, in a case in which the phosphate ester compound including phosphoric acid is dissolved in a solvent, the dissolving property of the phosphate ester compound including phosphoric acid with respect to the mold can be rapidly determined when the concentration of the phosphate ester compound including phosphoric acid is as high as possible.

Meanwhile, the light transmissive film is frequently manufactured by the nanoimprint described above, but there are cases in which the phosphate ester compound including phosphoric acid bleeds out on the surface which comes into contact with the mold in a stage in which the curable composition is cured. When the phosphate ester compound including phosphoric acid excessively bleeds out (that is, when the amount of bleeding out is large), phosphoric acid included in the phosphate ester compound, which comes into contact with the mold, increases a great deal, and therefore, while light transmissive film is continuously produced, the mold surface is excessively dissolved, and the fine concavo-convex structure on the mold surface significantly changes.

As a result, the fine concavo-convex structure of the light transmissive film manufactured by the above mold also changes, and therefore the performances, such as antireflection properties, become likely to degrade. On the other hand, when the amount of bleeding out is too small, the effect as an internal release agent is not sufficiently exhibited, and it is difficult to obtain favorable release properties, but dissolution is suppressed even when the phosphate ester compound including phosphoric acid which dissolves a large amount of the mold is used, and therefore it becomes easy to use (control) the phosphate ester compound including phosphoric acid.

That is, for the phosphate ester compound including phosphoric acid, there is a demand for the balance between an appropriate dissolving property and an appropriate amount of bleeding out.

In the invention, the amount of phosphorous atoms on the surface of the obtained light transmissive film, on which the fine concavo-convex structure is formed, was used as an index for the amount of bleeding out.

The amount of phosphorous atoms can be measured by a method, such as X-ray photoelectron spectroscopy (XPS), fluorescent X-ray measurement or electron microscope-X-ray analysis, and, in the invention, the XPS was used from the viewpoint of surface sensitivity. In the invention, the atomic percentage of phosphorous atoms on the surface of the light transmissive film, which is measured by the XPS, is 0.001% to 0.14%. When the atomic percentage of phosphorous atoms on the surface of the light transmissive film is less than 0.001%, the phosphate ester compound including phosphoric acid does not sufficiently bleed out in the stage in which the curable composition is cured. On the other hand, when the atomic percentage of phosphorous atoms on the surface of the light transmissive film exceeds 0.14%, since the phosphate ester compound including phosphoric acid excessively bleeds out in the stage in which the curable composition is cured, it is difficult to use the phosphate ester compound including phosphoric acid having a high mold dissolving property.

Therefore, when the atomic percentage of phosphorous atoms on the surface of the light transmissive film is within the above range, since the phosphate ester compound including phosphoric acid appropriately bleeds out in the stage in which the curable composition is cured, and the phosphate ester compound including phosphorous acid sufficiently exhibits a function as an internal release agent, even when the phosphate ester compound including phosphoric acid having a high dissolving property with respect to a mold is used, it is possible to suppress the excessive dissolution of the mold surface and a significant change in the fine concavo-convex structure on the mold surface. Therefore, even in a case in which light transmissive film is continuously produced, it is possible to prevent contamination by appropriately dissolving the mold surface while maintaining the release properties for a long period of time, and therefore a light transmissive film having excellent antireflection properties can be obtained. The atomic percentage of phosphorous atoms on the surface of the light transmissive film is preferably 0.003% to 0.1%. Here, the surface of the light transmissive film refers to a visually observed surface.

Here, the atomic percentage of phosphorous atoms refers to the fraction of the number of phosphorous atoms with respect to the number of all atoms present on the surface of the light transmissive film, and can be measured, for example, by the following manner.

That is, the surface of the light transmissive film is measured by XPS, and, regarding the obtained XPS spectrum, the peak area intensity of all detected atoms and the peak area intensity of phosphorous atoms are calculated. Next, the respective peak area intensities are corrected by an apparatus-intrinsic relative sensitivity factor, and the atomic percentage of phosphorous atoms is obtained by the following formula.

Atomic percentage of phosphorous atoms (%)=(the peak area intensity of phosphorous atoms/the peak area intensity of all atoms)×100

The atomic percentage of phosphorous atoms on the surface of the light transmissive film can be adjusted selecting the kind or content of the phosphate ester compound including phosphoric acid in the curable composition, the kind of the polymerizable compound described below, and the like. For example, when the content of the phosphate ester compound including phosphoric acid is reduced, there is a tendency for the atomic percentage of phosphorous atoms to decrease.

In addition, when a polymerizable compound having a poor compatibility with the phosphate ester compound including phosphoric acid is combined to the phosphate ester compound including phosphoric acid, the phosphate ester compound including phosphoric acid is likely to bleed out onto the surface, and therefore there is a tendency for the atomic percentage of phosphorous atoms to increase.

In addition, the amount of bleeding out varies with the compatibility between the polymerizable compound and the mold dissolving component. Since the amount of bleeding out increases as the compatibility becomes poorer, there is a tendency for the dissolution rate of the mold to increase. Particularly, the amount of bleeding out of the phosphate ester compound including phosphoric acid significantly varies depending on the compatibility with the polymerizable compound.

Therefore, it is also possible to control the dissolution rate of the mold by adjusting the combination of the phosphate ester compound including phosphoric acid and the polymerizable compound.

As a method for confirming the compatibility of the phosphate ester compound including phosphoric acid, a method of determining the transparency when the phosphate ester compound is added to and stirred with the curable composition is considered. The transparency increases as the compatibility increases. As the evaluation of the transparency, a method of measuring a transmittance using light scattering or a spectrophotometer can be considered. In addition, in a case in which the actual addition amount of the phosphate ester compound including phosphoric acid is small, the compatibility may be determined with an equal or larger addition amount in a test. In a case in which the transparency is determined using transmittance, if the transmittance is 50% or more when 3 parts by mass of the phosphate ester compound including phosphoric acid is added to the curable composition, the compatibility is favorable, and therefore it is possible to suppress the amount of bleeding out, and to even use a phosphate ester compound including phosphoric acid, which has a high mold dissolving property. Furthermore, the transmittance is more preferably 60% or more. Meanwhile, in a case in which the phosphate ester compound including phosphoric acid is used as the mold dissolving component, since the effect as the mold dissolving component is exhibited in an extremely small amount, the transmittance is approximately 100%, the compatibility is favorable, and there is no problem with the release properties even when the amount of bleeding out is small.

The phosphate ester compound that can be used as the mold dissolving component is not particularly limited as long as the phosphate ester compound dissolves in the curable composition, but a polyoxyethylene alkyl phosphate ester compound represented by the following formula (1) (hereinafter referred to as "compound (1)") is preferable in terms of excellent maintenance of a release property.

[Chemical Formula 3]

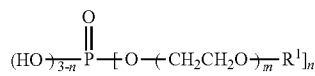

(1)

In the formula (1), $R^1$ represents an alkyl group. $R^1$ is preferably an alkyl group having 3 to 18 carbon atoms, and more preferably an alkyl group having 10 to 16 carbon atoms.

In addition, in the formula (1), m represents the average addition molar number of ethylene oxide, is an integer of 1 to 20, and is preferably an integer of 1 to 10. Meanwhile, n represents an integer of 1 to 3.

The compound (1) may be any of a monoester body (in the case of n=1), a diester body (in the case of n=2) and a triester body (in the case of n=3). In addition, in a case in which the compound (1) is a diester body or a triester body, a plurality of polyoxyethylene alkyl residues in one molecule may be the same as or different from each other.

When the compound (1) is used as the mold dissolving component, the release properties between the cured resin layer, which is a cured substance of the curable composition, and the mold improve more, and it is preferable for the formation of the fine concavo-convex structure. In addition, since the load becomes extremely low when the light transmissive film is released from the mold, a light transmissive film having a fine concavo-convex structure having a few defects transferred thereto, can be productively obtained. Furthermore, when the compound (1) is used, the release performance can be maintained for a longer period of time.

Among the compounds (1), a compound that satisfies the condition (a) and the above conditions regarding the concentration of phosphoric acid and pH, and can be used as the mold dissolving component, that is, the phosphate ester compound including phosphoric acid, which has an appropriate dissolving property and an appropriate amount of bleeding out can be procured from commercially available products.

Examples thereof include "TDP-10", "TDP-8", "TDP-6", "TDP-2", "DDP-10", "DDP-8", "DDP-6", "DDP-4", "DDP-2" manufactured by Nikko Chemicals Co., Ltd.; "INT-1856", "INT-AM121" manufactured by Accelerator; "JP506-H" manufactured by Johoku Chemical Industry Co., Ltd.; and the like.

The compounds (1) may be used solely, or two or more thereof may be used in combination. In a case in which two or more thereof are used in combination, the total content of the compounds (1) is used as the content of the mold dissolving component in the condition (c), the mold mass reduction rate and pH of each of the compounds are used as the mold mass reduction rate in the condition (a) and the pH in the condition (b), and the above values are used to determine whether or not the content, mold mass reduction rate and pH are within the ranges regulated in the invention.

The content of the mold dissolving component is preferably 0.01 parts by mass to 3 parts by mass, more preferably 0.03 parts by mass to 1 part by mass, and still more preferably 0.1 parts by mass to 0.5 parts by mass with respect to 100 parts by mass of the polymerizable compound described below.

When the content of the mold dissolving component is 0.01 parts by mass or more, the contamination of the mold surface can be effectively suppressed.

Additionally, it is possible to prevent a resin from remaining on the mold (poor release), which is caused by the degradation of the release properties from the mold, and to suppress the cured resin layer from being water-repellent (poor weather resistance).

Meanwhile, when the content of the mold dissolving component is 3 parts by mass or less, it is possible to prevent a resin from remaining on the mold (poor release), which is caused by the degradation of the adhesiveness with the base material film, while maintaining the original performances of the cured resin layer.

Additionally, it is possible to prevent the peeling between the base material film and the cured resin layer at the time of using the light transmissive film, and to suppress the occurrence of macules or poor appearance.

The content of the phosphate ester compound including phosphoric acid is not particularly limited as long as the atomic percentage of phosphorous atoms on the surface of the light transmissive film becomes within the above range, but is approximately 0.01 parts by mass to 3 parts by mass, preferably 0.03 parts by mass to 1 part by mass, and more preferably 0.1 parts by mass to 0.5 parts by mass with respect to 100 parts by mass of the polymerizable compound described below.

Meanwhile, in a case in which the characteristics of a film are adversely influenced by containing the phosphate ester compound including phosphoric acid in the curable composition, it is preferable to extremely reduce the content of the phosphate ester compound including phosphoric acid, and it is possible to secure sufficient release performance in a small content by selecting and using a phosphate ester compound including phosphoric acid which has a high mold dissolving property and easily bleeds out onto the surface in an appropriate amount.

(Other Internal Release Agents)

The curable composition may include internal release agents (other internal release agents) other than the mold dissolving component, which is the above phosphate ester compound including phosphoric acid as necessary within a range in which the effects of the invention are not impaired.

Other internal release agents are not particularly limited as long as the internal release agents are well-known internal release agents which can be blended into the active energy ray-curable composition, and examples thereof include, among the above compounds (1), phosphate ester compounds including phosphoric acid that does not satisfy the conditions regarding the concentration of phosphoric acid and pH. In addition, examples include silicone-based compounds, fluorine-based compounds, and the like.

(Polymerizable Compound)

Examples of the polymerizable compound include monomers, oligomers, reactive polymers, hydrophobic materials described below, hydrophilic materials described below, and the like, all of which have a radical polymerizable bond and/or a cationic polymerizable bond in the molecule.

Examples of the monomer having a radical polymerizable bond include monofunctional monomers and polyfunctional monomers.

Examples of the monofunctional monomers include (meth)acrylate derivatives, such as methyl (meth)acrylate, ethyl (meth)acrylate, propyl (meth)acrylate, n-butyl (meth) acrylate, i-butyl (meth)acrylate, s-butyl (meth)acrylate, t-butyl (meth)acrylate, 2-ethylhexyl (meth)acrylate, lauryl (meth) acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth) acrylate, hydroxypropyl (meth)acrylate, 2-methoxyethyl (meth)acrylate and 2-ethoxyethyl (meth)acrylate; (meth) acrylic acid, (meth)acrylonitrile; styrene derivatives, such as styrene and α-methyl styrene; (meth)acrylamide derivatives, such as (meth)acrylamide, N-dimethyl (meth)acrylamide, N-diethyl (meth)acrylamide and dimethylaminopropyl (meth)acrylamide; and the like.

The above monofunctional monomers may be used solely, or two or more thereof may be jointly used.

Examples of the polyfunctional monomer include bifunctional monomers, such as ethylene glycol di(meth)acrylate, tripropylene glycol di(meth)acrylate, ethylene oxide-modified isocyanuric acid di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl)propane, 2,2-bis(4-(meth)acryloxyethoxyphenyl)propane, 2,2-bis(4-(3-(meth) acryloxy-2-hydroxypropoxy)phenyl)propane, 1,2-bis(3-(meth)acryloxy-2-hydroxypropoxy)ethane, 1,4-bis(3-(meth) acryloxy-2-hydroxypropoxy)butane, dimethylol tricyclodecane di(meth)acrylate, ethylene oxide adduct of bisphenol A di(meth)acrylate, propylene oxide adduct of bisphenol A di(meth)acrylate, hydroxypivalic acid neopentyl glycol di(meth)acrylate, divinylbenzene and methylenebisacrylamide; trifunctional monomers, such as pentaerythritol tri(meth)acrylate, trimethylolpropane tri(meth)acrylate, trimethylolpropane ethylene oxide-modified tri(meth)acrylate, trimethylolpropane propylene oxide-modified triacrylate and trimethylolpropane ethylene oxide-modified triacrylate, and ethylene oxide-modified isocyanuric acid tri(meth)acrylate; tetra or more-functional monomers, such as a condensation reaction mixture of succinic acid/trimethylolethane/acrylic acid, dipentaerythritol hexa(meth)acrylate, dipentaerythritol penta(meth)acrylate, ditrimethylolpropane tetraacrylate and tetramethylolmethane tetra(meth)acrylate; bi or more-functional urethane acrylates, bi or more-functional polyester acrylates and the like.

The above polyfunctional monomers may be used solely, or two or more thereof may be jointly used.

Examples of the monomer having a cationic polymerizable bond include monomers having an epoxy group, an oxetanyl group, an oxazolyl group, a vinyloxy group or the like, and monomers having an epoxy group are particularly preferable.

Examples of the oligomer or the reactive polymer include unsaturated polyesters, such as condensation products of an unsaturated dicarboxylic acid and a polyvalent alcohol; polyester (meth)acrylates, polyether (meth)acrylates, polyol (meth)acrylates, epoxy (meth)acrylates, urethane (meth) acrylates, cationic polymerizable epoxy compounds, sole or copolymerized polymers of the above monomers having a radical polymerizable bond in the side chain, and the like.

(Polymerization Initiator)

In a case in which a photo-curable reaction is used, examples of the photopolymerization initiator include carbonyl compounds, such as benzoin, benzoin methyl ether, benzoin ethyl ether, benzoin isopropyl ether, benzoin isobutyl ether, benzil, benzophenone, p-methoxybenzophenone, 2,2-diethoxy acetophenone, α,α-dimethoxy-α-phenyl acetophenone, methylphenyl glyoxylate, ethylphenyl glyoxylate, 4,4'-bis(dimethylamino)benzophenone and 2-hydroxy-2-methyl-1-phenylpropan-1-one; sulfur compounds, such as tetramethyl thiuram mono sulfide and tetramethyl thiuram disulfide; 2,4,6-trimethyl benzoyl diphenyl phosphine oxide, benzoyl diethoxy phosphine oxide, and the like.

The above polymerization initiator may be used solely, or two or more thereof may be jointly used.

In a case in which an electron ray-curable reaction is used, examples of the polymerization initiator include thioxanthones, such as benzophenone, 4,4-bis(diethylamino)benzophenone, 2,4,6-trimethyl benzophenone, methyl o-benzoyl benzoate, 4-phenyl benzophenone, t-butyl anthraquinone, 2-ethyl anthraquinone, 2,4-diethyl thioxanthone, isopropylthioxanthone and 2,4-dichlorothioxantone; acetophenones, such as diethoxyacetophenone, 2-hydroxy-2-methyl-1-phenyl propane-1-one, benzyl dimethyl ketal, 1-hydroxycyclohexyl-phenyl ketone, 2-methyl-2-morpholino(4-thiomethylphenyl)propane-1-one and 2-benzyl-2-dimethylamino-1-(4-morpholinophenyl)-butanone; benzoin ethers, such as benzoin methyl ether, benzoin ethyl ether, benzoin isopropyl ether and benzoin isobutyl ether; acyl phosphine oxides, such as 2,4,6-trimethylbenzoyldiphenylphosphine oxide, bis(2,6-dimethoxybenzoyl)-2,4,4-trimethylpentylphosphine oxide and bis(2,4,6-trimethylbenzoyl)-phenylphosphine oxide; methylbenzoyl formate, 1,7-bisacridinylheptane, 9-phenylacridine, and the like.

The above polymerization initiator may be used solely, or two or more thereof may be jointly used.

The content of the polymerization initiator is preferably 0.1 parts by mass to 10 parts by mass with respect to 100 parts by mass of the polymerizable compound. When the content of the polymerization initiator is less than 0.1 parts by mass, polymerization does not proceed easily. On the other hand, when the content of the polymerization initiator exceeds 10 parts by mass, there are cases in which the cured resin layer are colored, or the mechanical strength thereof decreases.

(Other Components)

The curable composition used in the invention may include, as necessary, a non-reactive polymer, an active energy ray sol-gel reactive composition, a ultraviolet absorbent and/or a light stabilizer, a lubricant, a plasticizer, an antistatic agent, a flame retardant, a flame retardant promoter, a polymerization inhibitor, a filler, a silane coupling agent, a colorant, a toughening agent, an inorganic filler, additives such as a fluorine compound for improving antifouling properties, fine particles, well-known additives such as an impact resistance modifier, and a small amount of solvent.

Non-Reactive Polymer:

Examples of the non-reactive polymer include acryl-based resins, styrene-based resins, polyurethanes, cellulose-based resins, polyvinyl butyral, polyesters, thermoplastic elastomers and the like.

Active energy ray sol-gel reactive composition:

Examples of the active energy ray sol-gel reactive composition include alkoxy silane compounds, alkyl silicate compounds and the like.

Examples of the alkoxy silane compound include compounds represented by the following formula (2) (hereinafter referred to as "compound (2)").

$$R^2{}_xSi(OR^3)_y \quad (2)$$

Here, in the formula (2), $R^2$ and $R^3$ represent an alkyl group having 1 to 10 carbon atoms respectively, x and y are integers that satisfy the relationship of $x+y=4$.

Specific examples of the compound (2) include tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, trimethylutoxysilane and the like.

Examples of the alkyl silicate compound include compounds represented by the following formula (3) (hereinafter referred to as "compound (3)").

$$R^4O[Si(OR^6)(OR^7)O]_zR^5 \quad (3)$$

Here, in the formula (3), $R^4$ to $R^7$ represent an alkyl group having 1 to 5 carbon atoms respectively, and z represents an integer of 3 to 20.

Specific examples of the compound (3) include methyl silicate, ethyl silicate, isopropyl silicate, n-propyl silicate, n-butyl silicate, n-pentyl silicate, acetyl silicate and the like.

Ultraviolet Absorbent and/or Light Stabilizer:

The ultraviolet absorbent and/or light stabilizer plays a role of supplying weather resistance, such as the suppression of yellowish stripes or the suppression of an increase in haze.

Examples of the ultraviolet absorbent and/or light stabilizer include benzophenone-based ultraviolet absorbents, benzotriazole-based ultraviolet absorbents, benzoate-based ultraviolet absorbents, hindered amine-based light stabilizers and the like.

Examples of the commercially available products include ultraviolet absorbents, such as "TINUVIN 400", "TINUVIN 479", "TINUVIN 109" manufactured by Ciba Specialty Chemicals Co., Ltd.; "Viosorb110" manufactured by Kyodo Chemical Co., Ltd., and light stabilizers, such as "TINUVIN 152", "TINUVIN 292" manufactured by Ciba Specialty Chemicals Co., Ltd.

The above ultraviolet absorbents and/or light stabilizers may be used solely, or two or more thereof may be jointly used.

The content of the ultraviolet absorbent and/or light stabilizer is preferably 0.01 parts by mass to 5 parts by mass, more preferably 0.01 parts by mass to 3 parts by mass, still more preferably 0.01 parts by mass to 1 part by mass, and particularly preferably 0.01 parts by mass to 0.5 parts by mass with respect to 100 parts by mass of the polymerizable compound.

When the content thereof is 0.01 parts by mass or more, it becomes easy to obtain the effect of improving weather resistance, such as the suppression of yellowish stripes or the suppression of an increase in haze.

On the other hand, when the content thereof is 5 parts by mass or less, since the curable composition is sufficiently cured, it is easy to suppress the degradation of the abrasion resistance of the cured resin layer.

In addition, the degradation of finger print-wiping properties in a weather resistance test can also be suppressed.

(Hydrophobic Material)

In order to set a water contact angle of the surface of the fine concavo-convex structure of the cured resin layer to 90° or more, a composition including a fluorine-containing compound or a silicone-based compound is preferably used as the polymerizable compound included in the curable composition that can form a hydrophobic material.

Fluorine-Containing Compound:

The fluorine-containing compound is preferably a compound having a fluoroalkyl group, which is represented by the following formula (4).

$$—(CF_2)_q—X \quad (4)$$

Here, in the formula (4), X represents a fluorine atom or a hydrogen atom, and q represents an integer of 1 or more, is preferably an integer of 1 to 20, more preferably an integer of 3 to 10, and particularly preferably an integer of 4 to 8.

Examples of the fluorine-containing compound include fluorine-containing monomers, fluorine-containing silane coupling agents, fluorine-containing surfactants, fluorine-containing polymers, and the like.

Examples of the fluorine-containing monomer include fluoroalkyl group-substituted vinyl monomers, fluoroalkyl group-substituted open-ring polymerizable monomers, and the like.

Examples of the fluoroalkyl group-substituted monomer include fluoroalkyl group-substituted (meth)acrylates, fluoroalkyl group-substituted (meth)acrylamides, fluoroalkyl group-substituted vinyl ethers, fluoroalkyl group-substituted styrenes, and the like.

Examples of the fluoroalkyl group-substituted open-ring polymerizable monomer include fluoroalkyl group-substituted epoxy compounds, fluoroalkyl group-substituted oxetane compounds, fluoroalkyl group-substituted oxazoline compounds, and the like.

The fluorine-containing monomer is preferably fluoroalkyl group-substituted (meth)acrylate, and particularly preferably a compound represented by the following formula (5).

$$CH_2=C(R^8)C(O)O—(CH_2)_p—(CF_2)_q—X \quad (5)$$

Here, in the formula (5), $R^8$ represents a hydrogen atom or a methyl group, X represents a hydrogen atom or a fluorine atom, p represents an integer of 1 to 6, is preferably an integer of 1 to 3, and more preferably 1 or 2, and q represents an integer of an integer of 1 to 20, is preferably an integer of 3 to 10, and more preferably 4 to 8.

The fluorine-containing silane coupling agent is preferably a fluoroalkyl group-substituted silane coupling agent, and particularly preferably a compound represented by the following formula (6).

$$(R^9)_aR^{10}{}_bSiY_c \quad (6)$$

Here, in the formula (6), $R^9$ represents a fluorine-substituted alkyl group having 1 to 20 carbon atoms, which may include one or more ether bonds or ester bonds. Examples of $R^9$ include 3,3,3-trifluoropropyl group, tridecafluoro-1,1,2,2-tetrahydrooctyl group, 3-trifluoromethoxypropyl group, 3-trifluoroacetoxypropyl group, and the like.

In addition, $R^{10}$ represents an alkyl group having 1 to 10 carbon atoms. Examples of $R^{10}$ include a methyl group, an ethyl group, a cyclohexyl group and the like.

Y represents a hydroxyl group or a hydrolyzable group.

Examples of the hydrolyzable group include an alkoxy group, a halogen atom, $R^{11}C(O)O$ (here, $R^{11}$ represents an alkyl group having 1 to 10 carbon atoms), and the like.

Examples of the alkoxy group include a methoxy group, an ethoxy group, a propyloxy group, an i-propyloxy group, a butoxy group, an i-butoxy group, a t-butoxy group, a pentyloxy group, a hexyloxy group, a cyclohexyloxy group, a heptyloxy group, an octyl oxy group, 2-ethylhexyloxy group, a nonyloxy group, a decyloxy group, 3,7-dimethyl-octyloxy group, a lauryloxy group and the like.

Examples of the halogen atom include Cl, Br, I, and the like.

Examples of $R^{11}C(O)O$ include $CH_3C(O)O$, $C_2H_5C(O)O$, and the like.

a, b and c represent integers satisfying a+b+c=4, a≥1 and c≥1, and it is preferable that a=1, b=0 and c=3.

Examples of the fluorine-containing silane coupling agent include 3,3,3-trifluoropropyltrimethoxysilane, 3,3,3-trifluoropropyltriacetoxysilane, dimethyl-3,3,3-trifluoropropyl-methoxysilane, tridecafluoro-1,1,2,2-tetrahydrooctyltriethoxysilane, and the like.

Examples of the fluorine-containing surfactant include fluoroalkyl group-containing anionic surfactants, fluoroalkyl group-containing cationic surfactants, and the like.

Examples of the fluoroalkyl group-containing anionic surfactant include fluoroalkyl carboxylic acids having 2 to 10 carbon atoms and metal salts thereof, disodium perfluorooctane sulfonyl glutamate, 3-[omega-fluoroalkyl (C6 to C11) oxy]-1-alkyl (C3 to C4) sulfonic acid sodium salt, 3-[omega-fluoroalkanoyl (C6 to C8)-N-ethylamino]-1-propanesulfonic acid sodium salt, fluoroalkyl (C11 to C20) carboxylic acids and metal salts thereof, perfluoroalkyl carboxylic acids (C7 to C13) and metal salts thereof, perfluoroalkyl (C4 to C12) sulfonic acids and metal salts thereof, perfluorooctane sulfonic acid diethanolamide, N-propyl-N-(2-hydroxyethyl) perfluorooctane sulfonamide, perfluoroalkyl (C6 to C10) sulfonamide propyl trimethyl ammonium salts, perfluoroalkyl (C6 to C10)-N-ethyl sulfonyl glycine salts, monoperfluoroalkyl (C6 to C16) ethyl phosphate, and the like.

Examples of the fluoroalkyl group-containing cationic surfactant include fluoroalkyl group-containing aliphatic primary, secondary or tertiary amino acids, aliphatic quaternary ammonium salts, such as perfluoroalkyl (C6 to C10) sulfonamide propyl trimethylammonium salts, benzalkonium salts, benzethonium chloride, pyridinium salts, imidazolinium salts and the like.

Examples of the fluorine-containing polymer include polymers of the fluoroalkyl group-containing monomers, copolymers of the fluoroalkyl group-containing monomer and a poly(oxyalkylene) group-containing monomer, copolymers of the fluoroalkyl group-containing monomer and a crosslinking reactive group-containing monomer, and the like. The fluorine-containing polymer may be a copolymer with other copolymerizable monomers.

The fluorine-containing polymer is preferably a copolymer of a fluoroalkyl group-containing monomer and poly(oxyalkylene) group-containing monomer.

The poly(oxyalkylene) group is preferably a group represented by the following formula (7).

$$—(OR^{12})_r— \quad (7)$$

Here, in the formula (7), $R^{12}$ represents an alkylene group having 2 to 4 carbon atoms, and r represents an integer of 2 or more. Examples of $R^{12}$ include $—CH_2CH_2—$, $—CH_2CH_2CH_2—$, $—CH(CH_3)CH_2—$, $—CH(CH_3)CH(CH_3)—$, and the like.

The poly(oxyalkylene) group may consist of the same oxyalkylene units $(OR^{12})$, or may be made up of two or more kinds of oxyalkylene units $(OR^{12})$. The sequence of the two or more kinds of oxyalkylene units $(OR^{12})$ may be a block or random.

Silicone-Based Compound:

Examples of the silicone-based compound include (meth)acrylic acid-modified silicone, silicone resins, silicone-based silane coupling agents, and the like.

Examples of the (meth)acrylic acid-modified silicone include silicone (di)(meth)acrylate and the like, and, for example, radical polymerizable silicone oils "x-22-164", "x-22-1602" and the like manufactured by Shin-Etsu Chemical Co., Ltd. are preferably used.

The content of the silicone-based compound is preferably 0.1 mass % to 30 mass %, more preferably 1 mass % to 20 mass %, and particularly preferably 5 mass % to 15 mass % in 100 mass % of the polymerizable compound.

(Hydrophilic Material)

In order to set the water contact angle of the surface of the fine concavo-convex structure of the cured resin layer to 25° or less, a composition including at least a hydrophilic monomer is preferably used as the polymerizable compound in the curable composition that can form a hydrophilic material. In addition, a composition including a crosslinkable polyfunctional monomer is more preferable from the viewpoint of supplying abrasion resistance or water resistance. Meanwhile, the hydrophilic monomer and the crosslinkable polyfunctional monomer may be the same monomer (that is, a hydrophilic polyfunctional monomer). Furthermore, the curable composition may also include other monomers.

As the curable composition that can form the hydrophilic material, a composition including the following polymerizable compound is more preferably used.

A total of 100 mass % of a polymerizable compound including 10 mass % to 50 mass % of tetra or more-polyfunctional (meth)acrylate, 30 mass % to 80 mass % of di or more-functional hydrophilic (meth)acrylate, and 0 mass % to 20 mass % of a monofunctional monomer.

Examples of the tetra or more-polyfunctional (meth)acrylate include ditrimethylolpropane tetra(meth)acrylate, pentaerythritol tetra(meth)acrylate, pentaerythritol ethoxy tetra(meth)acrylate, dipentaerythritol hydroxy penta(meth)acrylate, dipentaerythritol hexa(meth)acrylate, condensation reaction mixtures of succinic acid/trimethylolethane/acrylic acid at a molar ratio of 1:2:4, urethane acrylates ("EBECRYL220", "EBECRYL1290", "EBECRYL1290K", "EBECRYL5129", "EBECRYL8210", "EBECRYL8301", "KRM8200" manufactured by Daicel-Cytec Company Ltd.), polyether acrylates ("EBECRYL81" manufactured by Daicel-Cytec Company Ltd.), modified epoxy acrylates ("EBECRYL3416" manufactured by Daicel-Cytec Company Ltd.), polyester acrylates ("EBECRYL450", "EBECRYL657", "EBECRYL800", "EBECRYL810", "EBECRYL811", "EBECRYL812", "EBECRYL1830", "EBE- CRYL845", "EBECRYL846", "EBECRYL1870" manufactured by Daicel-Cytec Company Ltd.) and the like.

The above (meth)acrylate may be used solely, or two or more thereof may be jointly used.

The tetra or more-polyfunctional (meth)acrylate is more preferably penta or more-polyfunctional (meth)acrylate.

The content of the tetra or more-polyfunctional (meth) acrylate is preferably 10 mass % to 50 mass % in 100 mass % of the polymerizable compound, more preferably 20 mass % to 50 mass % in terms of water resistance and chemical resistance, and particularly preferably 30 mass % to 50 mass %. Meanwhile, the content of the tetra or more-polyfunctional (meth)acrylate is 10 mass % or more, the elastic modulus increases, and the abrasion resistance improves. When the content of the tetra or more-polyfunctional (meth)acrylate is 50 mass % or less, small cracks are not easily caused on the surface, and the appearance does not easily become poor.

Examples of the di or more-functional hydrophilic (meth) acrylate include polyfunctional acrylates having a long chain polyethylene glycol, such as "ARONIX M-240", "ARONIX M260" manufactured by Toagosei Co., Ltd.; "NK ESTER AT-20E", "NK ESTER ATM-35E" manufactured by Shin-Nakamura Chemical Industry Co., Ltd., polyethylene glycol dimethacrylates, and the like.

The above (meth)acrylate may be used solely, or two or more thereof may be jointly used.

In the polyethylene glycol dimethacrylate, the total of the average repetition units of a polyethylene glycol chain present in a molecule is preferably 6 to 40, more preferably 9 to 30, and particularly preferably 12 to 20. When 6 or more average repetition units of the polyethylene glycol chain are present, the material becomes sufficiently hydrophilic, and the antifouling properties improve. When 40 or less average repetition units of the polyethylene glycol chain are present, the compatibility with the tetra or more-polyfunctional (meth)acrylate becomes favorable, and the curable composition is not easily separated.

The content of the di or more-functional hydrophilic (meth)acrylate is preferably 30 mass % to 80 mass %, and more preferably 40 mass % to 70 mass % in 100 mass % of the polymerizable compound. When the content of the di or more-functional hydrophilic (meth)acrylate is 30 mass % or more, the material becomes sufficiently hydrophilic, and the antifouling properties improve. On the other hand, when the content of the di or more-functional hydrophilic (meth)acrylate is 80 mass % or less, the elastic modulus increases, and the abrasion resistance improves.

The monofunctional monomer is preferably a hydrophilic monofunctional monomer.

Examples of the hydrophilic monofunctional monomer include monofunctional (meth)acrylates having a polyethylene glycol chain in an ester group, such as "M-20G", "M-90G" and "M-230G" manufactured by Shin-Nakamura Chemical Co., Ltd.; monofunctional (meth)acrylates having a hydroxyl group in an ester group, such as hydroxyalkyl (meth)acrylate; monofunctional acrylamides; cationic monomers, such as methacrylamide propyl trimethylammonium methyl sulfate and methacryloyloxy ethyl trimethyl ammonium methyl sulfate; and the like.

In addition, as the monofunctional monomer, a viscosity adjuster such as acryloylmorpholine or vinylpyrrolidone, an adhesiveness improver that improves the adhesiveness to the base material film, such as acryloyl isocyanates, and the like may be used.

The content of the monofunctional monomer is preferably 0 mass % to 20 mass %, and more preferably 5 mass % to 15 mass % in 100 mass % of the polymerizable compound.

When the monofunctional monomer is used, the adhesiveness between the base material film and the cured resin layer improves. When the content of the monofunctional monomer is 20 mass % or less, the tetra or more-polyfunctional (meth) acrylate or the di or more-functional hydrophilic (meth)acrylate does not becomes insufficient, and the antifouling property or the abrasion resistance is sufficiently developed.

The monofunctional monomer may be blended into the curable composition as a polymer having a low degree of polymerization, in which one or two or more monomers are (co)polymerized, in 0 parts by mass to 35 parts by mass. Examples of the polymer having a low degree of polymerization include monofunctional (meth)acrylates having a polyethylene glycol chain in an ester group, such as "M-230G" manufactured by Shin-Nakamura Chemical Co., Ltd.; 40/60-copolymerized oligomers with methacrylamide propyl trimethyl ammonium methyl sulfate ("MG polymer" manufactured by MRC Unitech Co., Ltd.), and the like.

<Effects>

Since the curable composition according to the invention described above contains the mold dissolving component including the phosphate ester compound including the specific phosphoric acid, it is possible to extremely slightly dissolve the mold surface.

As a result, since the mold surface is renewed at all times, it is possible to prevent the deposition of an attachment on the mold surface and the contamination of the mold surface.

In addition, since the phosphate ester compound including phosphoric acid also plays a role of an internal release agent, the release properties between the mold and the cured resin layer can be maintained for a long period of time.

<Method for Manufacturing the Light Transmissive Film>

The light transmissive film in a third aspect of the invention is manufactured by transferring a fine concavo-convex structure on the surface of a mold.

Specifically, the light transmissive film is manufactured by undergoing a step of sandwiching the above curable composition between a mold having an inversion structure of the fine concavo-convex structure on the light transmissive film surface on the surface and the base material film (sandwiching step), a step of irradiating the curable composition with active energy rays, and curing the curable composition, thereby obtaining a light transmissive film having a cured resin layer having the inversion structure of the mold transferred thereto, formed on the surface of the base material film (transferring step), and a step of separating the obtained light transmissive film and the mold (separating step).

The fine concavo-convex structure can be formed by transferring the fine concavo-convex structure of the mold on the surface thereof using the nanoimprint method.

The height of the fine concavo-convex structure is preferably uniform in the longitudinal direction of the film. Here, the height of the fine concavo-convex structure being uniform refers to a state in which the difference in the height in the fine concavo-convex structure is 10 nm or less.

(Base Material Film)

Since active energy rays are radiated beyond the film, the base material film is preferably a highly light-transmissive film, and, for example, an acryl film or a polyethylene terephthalate (PET) film, a polycarbonate film, a triacetyl cellulose (TAC) film, or the like can be used.

(Mold)

Examples of the material for the mold include metals (including metal having an oxide film formed on the surface thereof), silica, glass, resins, ceramics, and the like.

The mold used in the invention can be manufactured using, for example, a method (I) or (II) described below. Among them, the method (I) is particularly preferable since the area can be increased, and the mold is easily manufactured.

(I) A method in which an anodized alumina having a plurality of fine pores (concave portions) is formed on the surface of an aluminum base material.

(II) A method in which a fine concavo-convex structure is formed on the surface of a base material using a lithography method.

The method (I) preferably has the following steps (a) to (e).

(a) A step of anodizing the aluminum base material in an electrolytic solution at a constant voltage so as to form an oxide film on the surface of the aluminum base material.

(b) A step of removing the oxide film so as to form fine pore-generating points for anodizing on the surface of the aluminum base material.

(c) A step of anodizing the aluminum base material again in an electrolytic solution so as to form an oxide film having fine pores at the fine pore-generating points.

(d) A step of enlarging the diameters of the fine pores.

(e) A step of repeating the steps (c) and (d) so as to obtain a mold having anodized alumina having a plurality of fine pores formed on the surface of the aluminum base material.

Step (a):

As illustrated in FIG. 1, when an aluminum base material 10 is anodized, an oxide film 14 having fine pores 12 is formed.

Examples of the shape of the aluminum base material include a roll shape, a circular pipe shape, a tabular shape, a sheet shape, and the like.

In addition, the aluminum base material is preferably grounded using mechanical grinding, fabric grinding, chemical grinding, an electrolytic grinding treatment (etching treatment) or the like in order to flatten the surface state. In addition, since there are cases in which oil used when processing the aluminum base material into a predetermined shape is attached to the aluminum base material, it is preferable to carry out a degreasing treatment in advance before anodizing.

The purity of aluminum is preferably 99% or more, more preferably 99.5% or more, and particularly preferably 99.8% or more. When the purity of aluminum is low, there are cases in which a concavo-convex structure, which is large enough to scatter visible light due to the segregation of impurities during anodizing, is formed, or the regularity of fine pores obtained by anodizing degrades.

Examples of the electrolytic solution include sulfuric acid, oxalic acid, phosphoric acid, and the like.

In a case in which oxalic acid is used as the electrolytic solution:

The concentration of oxalic acid is preferably 0.7 M or less. When the concentration of oxalic acid exceeds 0.7 M, there are cases in which a current value excessively increases so as to coarsen the surface of the oxide film.

When a formation voltage is 30 V to 60 V, it is possible to obtain anodized alumina having highly regular fine pores at average intervals of 100 nm. When the formation voltage is both below and beyond the above range, there is a tendency for the regularity to degrade.

The temperature of the electrolytic solution is preferably 60° C. or lower, and more preferably 45° C. or lower. When the temperature of the electrolytic solution exceeds 60° C., a phenomenon of so-called "baking" occurs, the fine pores collapse, or the surface is melted so as to destroy the regularity of the fine pores.

In a case in which sulfuric acid is used as the electrolytic solution:

The concentration of sulfuric acid is preferably 0.7 M or less. When the concentration of sulfuric acid exceeds 0.7 M, there are cases in which the current value excessively increases such that the constant voltage cannot be maintained.

When the formation voltage is 25 V to 30 V, it is possible to obtain anodized alumina having highly regular fine pores at average intervals of 63 nm. When the formation voltage is both below and beyond the above range, there is a tendency for the regularity to degrade.

The temperature of the electrolytic solution is preferably 30° C. or lower, and more preferably 20° C. or lower. When the temperature of the electrolytic solution exceeds 30° C., a phenomenon of so-called "baking" occurs, the fine pores collapse, or the surface is melted so as to destroy the regularity of the fine pores.

Step (b):

As illustrated in FIG. 1, it is possible to improve the regularity of the fine pores by temporarily removing the oxide film 14, and using the oxide film as the fine pore-generating points 16 for anodizing. Meanwhile, in a case in which a very high regularity is not required, at least a part of the oxide film 14 may be removed, or the step (d) described below may be carried out after the step (a).

An example of the method for removing the oxide film includes a method in which the oxide film is dissolved and removed in a solution that does not dissolve aluminum and selectively dissolves the oxide film. Examples of the above solution include chromic acid/phosphoric acid mixtures and the like.

Step (c):

As illustrated in FIG. 1, when the aluminum base material 10, from which the oxide film has been removed, is anodized again, an oxide film 14 having cylindrical pores 12 is formed.

The anodizing may be carried out under the same conditions as in the step (a). As the time of the anodizing increases, deep fine pores can be obtained.

Step (d):

As illustrated in FIG. 1, a treatment for enlarging the diameters of the fine pores 12 (hereinafter referred to as fine pore diameter-enlarging treatment) is carried out. The fine pore diameter-enlarging treatment is a treatment for enlarging the diameters of fine pores obtained through anodizing by immersing the oxide film in a solution that dissolves the oxide film. Examples of the above solution include approximately 5 mass % of a phosphoric acid aqueous solution and the like.

As the time of the fine pore diameter-enlarging treatment increases, the diameters of the fine pores increase.

Step (e):

As illustrated in FIG. 1, when the anodizing of the step (c) and the fine pore diameter-enlarging treatment of the step (d) are repeated, the oxide film 14 having the fine pores 12 with a shape, whose diameter continuously decreases from an opening portion in a depth direction, is formed, and a mold main body 18 having anodized alumina (porous oxide film of aluminum (alumite)) on the surface of the aluminum base material 10 is obtained.

The steps are preferably repeated three or more times in total, and more preferably five or more times. When the steps are repeated two or less times, since the diameters of the fine pores decrease discontinuously, the reflection rate-reducing effect of a fine concavo-convex structure (moth-eye structure), which is formed using anodized alumina having the above fine pores, is insufficient.

Examples of the shape of the fine pore 12 include a substantially conic shape, a pyramid shape, a cylindrical shape and the like, and a preferable shape of the fine pore has a cross-sectional area in a direction orthogonal to the depth direction continuously decreasing in the depth direction from an outermost surface.

The average interval between the fine pores 12 is the wavelength or less of visible light, that is, 400 nm or less. The average interval between the fine pores 12 is preferably 20 nm or more.

The average interval between the fine pores 12 is obtained by measuring 50 intervals between the adjacent fine pores 12 (the distance from the center of the fine pore 12 to the center of the adjacent fine pore 12) through electron microscope observation, and averaging the values.

In a case in which the average interval is 100 nm, the depth of the fine pore 12 is preferably 80 nm to 500 nm, more preferably 120 nm to 400 nm, and particularly preferably 150 nm to 300 nm.

The depth of the fine pore 12 is a value obtained by measuring the distance between a bottom portion of the fine pore 12 and a top portion of a protrusion portion present between the fine pores 12 when the concavo-convex structure is observed at 30000 times through electron microscope observation.

The aspect ratio (the depth of the fine pore/the average interval between the pores) of the fine pore 12 is preferably 0.8 to 5.0, more preferably 1.2 to 4.0, and particularly preferably 1.5 to 3.0.

Other Steps:

In the invention, the mold main body 18 obtained in the step (e) may be used as a mold as it is, but the fine concavo-convex structure-formed surface of the mold main body 18 may be treated using a release agent (external release agent).

The release agent preferably has a functional group that can form a chemical bond with the anodized alumina of the aluminum base material. Specific examples thereof include silicone resins, fluorine resins, fluorine compounds, and the like, the examples preferably have a silanol group or a hydrolyzable silyl group since the release properties are excellent, and the adhesiveness with the mold main body is excellent, and, among the above, fluorine compounds having a hydrolyzable silyl group are particularly preferable.

Examples of the commercially available product of the fluorine compound having a hydrolyzable silyl group include fluoroalkylsilane, "KBM-7803" manufactured by Shin-Etsu Chemical Co., Ltd.; "OPTOOL" series manufactured by Daikin Industries, Ltd.; NOVEC EGC-1720" manufactured by Sumitomo 3M, and the like.

Examples of the treatment method using the release agent include the following methods 1 and 2, and the method 1 is particularly preferable since the fine concavo-convex structure-formed surface of the mold main body can be evenly treated using the release agent.

Method 1: A method of immersing the mold main body in a diluted solution of the release agent.

Method 2: A method of coating the release agent or a diluted solution thereof on the fine concavo-convex structure-formed surface of the mold main body.

The method 1 preferably has the following steps (f) to (j).

(f) A step of washing the mold main body using water.

(g) A step of blowing air into the mold main body, and removing water droplets attached to the surface of the mold main body.

(h) A step of immersing the mold main body in a diluted solution obtained by diluting the fluorine compound having a hydrolyzable silyl group using a solvent.

(i) A step of slowly lifting the immersed mold main body from the solution.

(j) A step of drying the mold main body.

Step (f):

Since chemicals used when forming a porous structure (a phosphoric acid aqueous solution and the like used in the fine pore diameter-enlarging treatment), impurities (dust and the like) and the like are attached to the mold main body, the chemicals are removed through water washing.

Step (g):

Air is blown to the mold main body, and almost all visible water droplets are removed.

Step (h):

As a diluting solvent, a well-known solvent, such as a fluorine-based solvent or an alcohol-based solvent, may be used. Among the above, a fluorine-based solvent is preferable since the fluorine-based solvent has appropriate volatile properties, wetting properties and the like so that an external release agent solution can be uniformly coated. Examples of the fluorine-based solvent include hydrofluoropolyether, perfluorohexane, perfluororo methyl cyclohexane, perfluoro-1, 3-dimethyl cyclohexane, dichloropentafluoropropane, and the like.

The concentration of fluorine compound having a hydrolyzable silyl group is preferably 0.01 mass % to 0.2 mass % in the diluted solution (100 mass %).

The immersion time is preferably 1 minute to 30 minutes.

The immersion temperature is preferably 0° C. to 50° C.

Step (i):

When the immersed mold main body is lifted from the solution, it is preferable to lift the mold main body at a constant rate using an electromotive lifter or the like so as to suppress vibration during lifting. Thereby, uneven coating can be decreased.

The lifting rate is preferably 1 mm/second to 10 mm/second.

Step (j):

In the step of drying the mold main body, the mold main body may be dried using wind, or may be forcibly heated and dried using a dryer or the like.

The drying temperature is preferably 30° C. to 150° C.

The drying time is preferably 5 minutes to 300 minutes.

Meanwhile, the fact that the surface of the mold main body has been treated using the release agent can be confirmed by measuring the water contact angle of the surface of the mold main body. The water contact angle of the surface of the mold main body treated using the release agent is preferably 60° or more, and more preferably 90° or more. When the water contact angle is 60° or more, the surface of the mold main body is sufficiently treated using the release agent, and the release properties become favorable.

(Manufacturing Apparatus)

Figure 2:
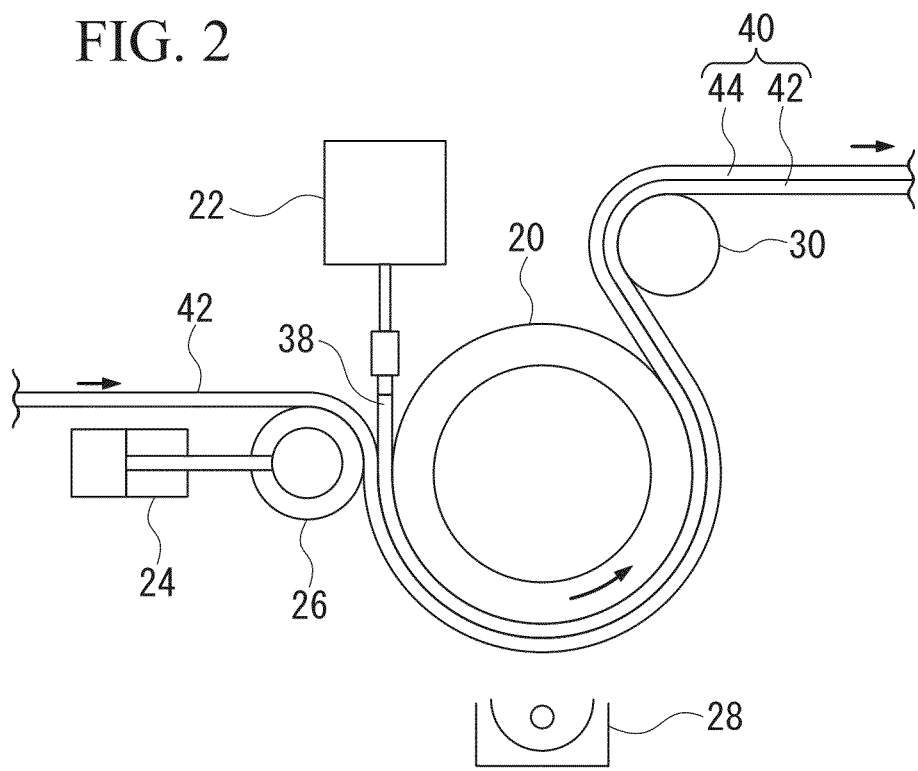
FIG. 2 is a configuration view illustrating an example of an apparatus for manufacturing a light transmissive film having a fine concavo-convex structure on the surface thereof.

The light transmissive film is manufactured in the following manner using, for example, a manufacturing apparatus illustrated in FIG. 2.

A curable composition 38 is supplied from a tank 22 between a roll-shaped mold 20 having a fine concavo-convex structure (not shown) on the surface and a strip-shaped base material film 42 moving along the surface of the roll-shaped mold 20.

The base material film 42 and the curable composition 38 are nipped between the roll-shaped mold 20 and a nip roll 26, whose nip pressure is adjusted using a pneumatic cylinder 24, the curable composition 38 is uniformly spread between the base material film 42 and the roll-shaped mold 20, and, at the same time, fills the recess portions of the fine concavo-convex structure of the roll-shaped mold 20.

Active energy rays are radiated on the curable composition 38 through the base material film 42 from an active energy ray-radiating apparatus 28 installed below the roll-shaped mold 20, and the curable composition 38 is cured, thereby forming a cured resin layer 44 having the fine concavo-convex structure on the surface of the roll-shaped mold 20 transferred thereto.

Figure 3:
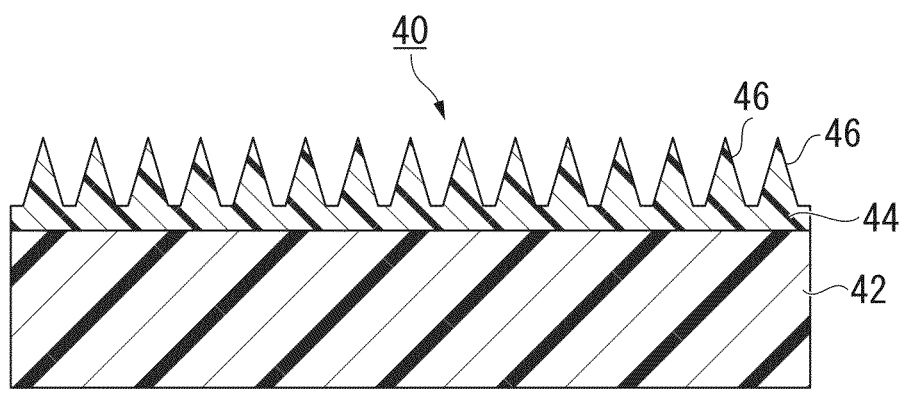
FIG. 3 is a cross-sectional view illustrating an example of a light transmissive film having a fine concavo-convex structure on the surface thereof.

The base material film 42 having the cured resin layer 44 formed on the surface is peeled from the roll-shaped mold 20 using a peeling roll 30, thereby obtaining a light transmissive film 40 as illustrated in FIG. 3.

The active energy ray-radiating apparatus 28 is preferably a high-pressure mercury lamp, a metal halide lamp, or the like, and, in this case, the amount of light radiation energy is preferably 100 mJ/cm$^2$ to 10000 mJ/cm$^2$.

<Light Transmissive Film>

FIG. 3 is a cross-sectional view illustrating an example of the light transmissive film 40 having the fine concavo-convex structure on the surface.

The base material film 42 is a light transmissive film.

Examples of the material of the base material film include an acryl film, a PET film, a polycarbonate film, a TAC film, and the like.

The light transmissive film of the invention, which is obtained in the above manner, has, for example, the base material film 42 and the cured resin layer 44 formed on the base material film 42 having the fine concavo-convex structure transferred thereto, as illustrated in FIG. 3.

The base material film 42 is preferably a light transmissive film. Specific examples thereof include an acryl film, a PET film, a polycarbonate film, a TAC film, and the like.

The cured resin layer 44 is a film made of a cured substance of the above curable composition, and has a fine concavo-convex structure on the surface.

In a case in which a mold of anodized alumina is used, the fine concavo-convex structure on the surface of the light transmissive film 40 is formed by transferring the fine concavo-convex structure on the surface of the anodized alumina, and has a plurality of protrusion portions 46 made of the cured substance of the curable composition.

The fine concavo-convex structure is preferably a so-called moth-eye structure having an array of a plurality of protrusions (protrusion portions) with a substantially conic shape, a pyramid shape or the like. It is known that the moth-eye structure having an interval between the protrusions of the wavelength or less of visible light serves as effective antireflection means since the refractive index continuously increases from the refractive index of air to the refractive index of the material.

The average interval between the protrusion portions is the wavelength or less of visible light, that is, 400 nm or less. In a case in which the protrusion portions are formed using the mold of anodized alumina, the average interval between the protrusions is particularly preferably 250 nm or less since the average interval becomes from 100 nm to approximately 200 nm.

In addition, the average interval between the protrusion portions is preferably 20 nm or more in terms of the easy formation of the protrusion portions.

The average interval between the protrusion portions is obtained by measuring 50 intervals between the adjacent protrusion portions (the distance from the center of the protrusion portion to the center of the adjacent protrusion portion) through electron microscope observation, and averaging the values.

In a case in which the average interval is 100 nm, the height of the protrusion portion is preferably 80 nm to 500 nm, more preferably 120 nm to 400 nm, and particularly preferably 150 nm to 300 nm. When the height of the protrusion portion is 80 nm or more, the reflection rate of the light transmissive film sufficiently decreases, and the dependency of the reflection rate on wavelength is small. When the height of the protrusion portion is 500 nm or less, the abrasion resistance of the protrusion portion becomes favorable.

The height of the protrusion portion is a value obtained by measuring the distance between a top portion of the protrusion portion and a bottom portion of the recess portion present between the protrusion portions when the concavo-convex structure is observed at 30000 times through electron microscope observation.

The aspect ratio (the height of the protrusion portion/the average interval between the protrusion portions) of the protrusion portion is preferably 0.8 to 5.0, more preferably 1.2 to 4.0, and particularly preferably 1.5 to 3.0. When the aspect ratio of the protrusion portion is 0.8 or more, the reflection rate of the light transmissive film sufficiently decreases. When the aspect ratio of the protrusion portion is 5.0 or less, the abrasion resistance of the protrusion portion becomes favorable.

A preferable shape of the protrusion portion has a cross-sectional area in a direction orthogonal to the height direction continuously increasing in the depth direction from an outermost surface, that is, the cross-sectional shape in the height direction of the protrusion portion is preferably a triangular, trapezoidal, hanging bell-like shape.

The difference between the refractive index of the cured resin layer 44 and the refractive index of the base material film 42 is preferably 0.2 or less, more preferably 0.1 or less, and particularly preferably 0.05 or less. When the difference of the refractive index is 0.2 or less, reflection at the interface between the cured resin layer 44 and the base material film 42 is suppressed.

In a case in which the fine concavo-convex structure is present on the surface, it is known that, when the surface is formed of a hydrophobic material, extreme water repellency is obtained by the lotus effect, and, when the surface is formed of a hydrophilic material, extreme hydrophilicity is obtained.

In a case in which the material of the cured resin layer 44 is hydrophobic, the water contact angle of the surface of the fine concavo-convex structure is preferably 90° or more, more preferably 110° or more, and particularly preferably 120° or more. When the water contact angle is 90° or more, since water contaminants are not easily attached, sufficient antifouling properties are exhibited. In addition, since water is not easily attached, the prevention of icing can be expected.

In a case in which the material of the cured resin layer 44 is hydrophilic, the water contact angle of the surface of the fine concavo-convex structure is preferably 25° or less, more preferably 23° or less, and particularly preferably 21° or less. When the water contact angle is 25° or less, since contaminants attached to the surface are washed away using water, and the attachment of oil contaminants becomes difficult, sufficient antifouling properties are exhibited. The water contact angle is preferably 3° or more since the deformation of the fine concavo-convex structure due to the water absorption of the cured resin layer 44 and the resultant increase in the reflection rate are suppressed.

<Use of the Light Transmissive Film>

The light transmissive film 40 can be used for antireflection articles, antifogging articles, antifouling articles and water-repellent articles, and, more specifically, for display antireflection, automobile panels, automobile mirrors, automobile windows, light-extraction efficiency-improving members of organic or inorganic electroluminescence, solar cell members, and the like.

<Effects>

Since the light transmissive film of the invention, which has been described above, is formed by polymerizing and curing the curable composition including the phosphate ester compound including phosphoric acid satisfying the condition (a), on which the fine concavo-convex structure has been formed on the surface by transferring the fine concavo-convex structure on the mold surface, the phosphate ester compound including phosphoric acid in the curable composition extremely slightly dissolves the mold surface. As a result, the mold surface is renewed at all times, and therefore it is possible to prevent the deposition of an attachment on the mold surface and the contamination of the mold surface. In addition, since the phosphate ester compound including phosphoric acid also plays a role as an internal release agent, the release properties between the mold and the cured resin layer can be maintained for a long period of time.

Additionally, in the light transmissive film of the invention, the atomic percentage of phosphorous atoms on the surface of the light transmissive film, which is measured using XPS, is 0.001% to 0.14%. This means that the phosphate ester compound appropriately bleeds out in the stage in which the curable composition is cured, and it is possible to determine that the phosphate ester compound including phosphoric acid sufficiently functioned as an internal release agent, and an excessive dissolution of the mold surface and a significant change in the fine concavo-convex structure of the mold surface could be suppressed.

Therefore, according to the invention, even in a case in which light transmissive film is continuously produced, it is possible to appropriately dissolve the mold surface while maintaining the release properties for a long period of time, thereby preventing contamination, and therefore a light transmissive film having excellent antireflection properties can be obtained.

In the method for manufacturing a light transmissive film of the invention, which has been described above, since the curable composition of the invention is used, the release properties between the mold and the light transmissive film are excellent.

Therefore, light transmissive films can be productively manufactured.

In addition, when the light transmissive film of the invention is manufactured, the mold surface is extremely slightly dissolved by the phosphate ester compound including phosphoric acid in the mold dissolving component included in the curable composition.

Therefore, since the mold surface is renewed at all times, it is possible to prevent the deposition of an attachment on the mold surface and the contamination of the mold surface.

Therefore, it is possible to manufacture a light transmissive film having excellent performances, such as antireflection properties.

Other Embodiments

The method for manufacturing a light transmissive film is not limited to the above method. In the above method, the active energy rays are radiated on the base material film 42 using the manufacturing apparatus illustrated in FIG. 2 so as to manufacture the light transmissive film 40; however, for example, a light transmissive film may be manufactured in the following manner using a base material film supported by a supporting film.

Figure 4:
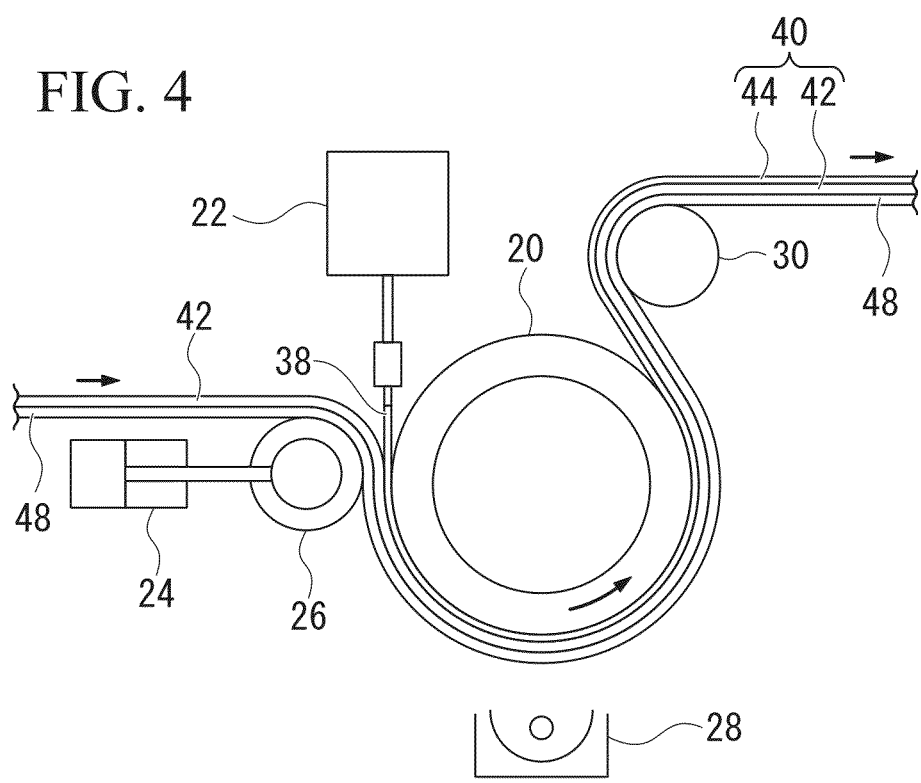
FIG. 4 is a view explaining another method for manufacturing a light transmissive film having a fine concavo-convex structure on the surface thereof.

That is, as illustrated in FIG. 4, the curable composition 38 is supplied between the surface of the base material film 42 supported from the rear surface side by a supporting film 48 and the roll-shaped mold 20, and active energy rays are radiated on the curable composition 38 through the supporting film 48, thereby manufacturing the light transmissive film 40 having the cured resin layer 44 with the fine concavo-convex structure formed on the surface of the base material film 42. The light transmissive film 40 obtained in the above manner is supported by the supporting film 48, and the supporting film 48 is peeled from the light transmissive film 40 as necessary.

The supporting film 48 is not particularly limited as long as the film can be peeled, and examples thereof include a PET film, a polycarbonate film and the like.

The supporting film 48 may be a single-layer film or a multi-layer film.

EXAMPLES

Hereinafter, the invention will be specifically described using examples, but the invention is not limited thereto.

(Measurement of the Concentration and pH of Phosphoric Acid)

The mold dissolving component (1 g) was dissolved in chloroform (50 mL), water (50 mL) was added to the solution, and the liquid mixture was violently stirred using a separating funnel (water extraction test).

Next, the liquid mixture was idled overnight, then, divided into an organic layer and a water layer (aqueous solution), and the concentration of phosphoric acid in the aqueous solution was measured using an ion chromatograph ("DX-500" manufactured by Dionex Corporation).

In addition, the pH of the aqueous solution was measured under a condition of 25° C. using a pH tester ("KASUTANI LAB" manufactured by Horiba, Ltd.).

(Analysis of the Mold Surface Using XPS)

When the light transmissive film (600 m) was manufactured, the mold surface was measured under a condition of Pass Energy 20 eV (narrow scan) using an X-ray photoelectron spectrometer ("ESCA LAB220iXL" manufactured by VG) and a 200 W monochromatic X-ray source (Alk$\alpha$).

For an XPS spectrum obtained from the above measurement, first, the peak area intensity of a peak (Al2p) of aluminum and the peak area intensity of a peak (P2p) of phosphorous were computed.

Next, the respective peak area intensities were corrected using an apparatus-intrinsic relative sensitivity factor, the proportions were obtained, and the P/Al atomic percentage ratio in the composition of the mold surface was obtained.

In addition, an analysis was carried out using XPS under the same conditions as above, and the detection of Na was carried out.

(Electron Microscope Observation)

Some of the anodized alumina was cut, platinum was evaporated on a cross-section for 1 minute, the cross-section was observed using a field emission scanning electron microscope ("JSM-7400F" manufactured by JEOL Ltd.) under a condition of an accelerating voltage of 3.00 kV, and the interval between the fine pores and the depth of the fine pore were measured.

(Measurement of the Reduction Rate by the Dissolution of the Mold)

The mold was immersed in the phosphate ester compound including phosphoric acid at 50° C. for 22 hours, thereby carrying out an immersion test.

After the immersion test, the mold was removed, and washed using acetone and chloroform. The masses of the mold before the immersion test and after the washing were measured, and the reduction rate was obtained using the following formula.

Reduction rate (%)={(the mass of the mold before immersion−the mass of the mold after cleansing)/the mass of the mold before immersion}×100

(Analysis of the Film Surface Using XPS)

The surface of the light transmissive film was measured under a condition of Pass Energy 20 eV (narrow scan) using an X-ray photoelectron spectrometer ("ESCA LAB220iXL" manufactured by VG) and a 200 W monochromatic X-ray source (Alk$\alpha$).

For an XPS spectrum obtained from the above measurement, the peak area intensity of all detected atoms and the peak area intensity of a peak (P2p) of phosphorous atoms were computed. Next, the respective peak area intensities were corrected using an apparatus-intrinsic relative sensitivity factor, and the atomic percentage of phosphorous atoms was obtained using the following formula.

Atomic percentage of phosphorus atoms=(the peak area intensity of phosphorous atoms/the peak area intensity of all atoms)×100

(Evaluation of Antireflection Properties)

For a light transmissive film having a black-coated surface, on which the fine concavo-convex structure was not formed, the relative reflection rate was measured at wavelengths of 380 nm to 780 nm under a condition of an incident angle of 5° using a spectrophotometer ("U-4100" manufactured by Hitachi, Ltd.). A decrease in the relative reflection rate means that the antireflection properties are excellent.

(Manufacturing of the Mold)

A forging treatment was carried out on an aluminum ingot having a purity of 99.9%, a fabric grinding treatment was carried out on a rolling trace-free cylindrical aluminum prototype having an average crystal grain diameter of 40 µm, which had been cut into a diameter of 200 mm and a length of 350 mm, then, the prototype was electrolytic-grounded in a solution mixture of perchloric acid/ethanol (volume ratio: 1/4), mirror-polished, and used as an aluminum base material.

Step (a):

The aluminum prototype was anodized in a 0.3 M oxalic acid aqueous solution for 30 minutes under conditions of a direct current of 40 V and a temperature of 16° C.

Step (b):

The aluminum prototype having a 3 µm-thick oxide film formed thereon was immersed in a 6 mass % phosphoric acid/1.8 mass % chromic acid mixture aqueous solution for 2 hours, thereby removing the oxide film.

Step (c):

The aluminum prototype was anodized in a 0.3 M oxalic acid aqueous solution for 30 seconds under conditions of a direct current of 40 V and a temperature of 16° C.

Step (d):

The aluminum prototype having an oxide film formed thereon was immersed in a 5 mass % phosphoric acid aqueous solution at 30° C. for 8 minutes, thereby carrying out a fine pore diameter-enlarging treatment.

Step (e):

The steps (c) and (d) were repeated a total of 5 times, and a roll-shaped mold main body having anodized alumina having substantially conic fine pores with an average interval of 100 nm and a depth of 160 nm formed on the surface was obtained.

Step (f):

The phosphoric acid aqueous solution on the surface was lightly washed away using a shower, and then the mold main body was immersed in flowing water for 10 minutes.

Step (g):

Air was blown to the mold main body from an air gun, thereby removing water droplets attached to the surface of the mold main body.

Step (h):

The mold main body was immersed in a solution obtained by diluting OPTOOL DSX (manufactured by Daikin Chemicals Sales Co., Ltd.) to 0.1 mass % using a diluent HD-ZV (manufactured by Harvesting Co., Ltd.) at room temperature for 10 minutes.

Step (i):

The mold main body was slowly lifted from the diluted solution at 3 mm/second.

Step (j):

The mold main body was dried overnight, thereby obtaining a mold treated using a release agent.

Figure 5:
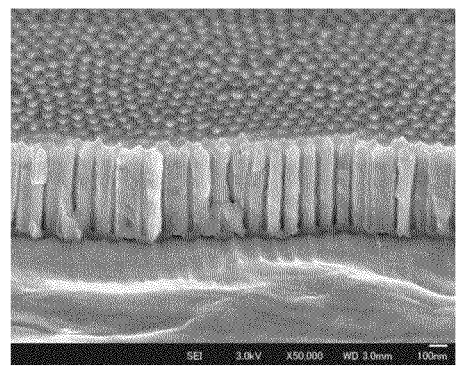
FIG. 5 is a scanning electron microscopic image of a mold surface before an immersion test.

A scanning electron microscopic image of the obtained mold is illustrated in FIG. 5.

Meanwhile, in the measurement of the reduction rate by the dissolution of the mold, a mold that underwent through the above step (c) using a 50 mm×50 mm×0.3 mm (thickness) aluminum sheet (purity 99.99%) as an aluminum base material was used.

Example 1

Preparation of the Curable Composition

Polyethylene glycol diacrylate ("ARONIX M260" manufactured by Toagosei Co., Ltd., 20 parts by mass) as the polymerizable compound and a condensation reactant of trimethylolethane/acrylic acid/succinic anhydride ("TAS" manufactured by Osaka Organic Chemical Industry Co., Ltd., 70 parts by mass), hydroxyethyl acrylate (manufactured by Osaka Organic Chemical Industry Co., Ltd., 3 parts by mass), and methyl acrylate (manufactured by Mitsubishi Chemical Corporation, 7 parts by mass) were mixed, thereby preparing a liquid mixture.

To the above liquid mixture, 1-hydroxycyclohexyl-phenyl ketone ("IRGACURE184" manufactured by Ciba Specialty Chemicals Co., Ltd., 1.0 part by mass) as the polymerization initiator, bis(2,4,6-trimethyl benzoyl)-phenyl phosphine oxide ("IRGACURE819" manufactured by Ciba Specialty Chemicals Co., Ltd., 0.1 parts by mass), polyoxyethylene alkyl phosphoric acid ester, which was a phosphate ester compound mainly including phosphoric acid, ("NIKKOL TDP-2" manufactured by Nikko Chemicals Co., Ltd., 0.3 parts by mass) as the mold dissolving component, and an ultraviolet absorbent ("Viosorb110" manufactured by Kyodo Chemical Co., Ltd., 0.2 parts by mass) were added, and a curable composition was prepared.

For the mold dissolving component used for the preparation of the curable composition, the concentration of phosphoric acid and pH of the aqueous solution obtained from the water extraction test were measured.

The results are described in Table 1.

In addition, an immersion test of the mold was carried out using the mold dissolving component, and the mold solubility was evaluated.

The reduction rates of the mass of the mold are described in Table 1.

Figure 6:
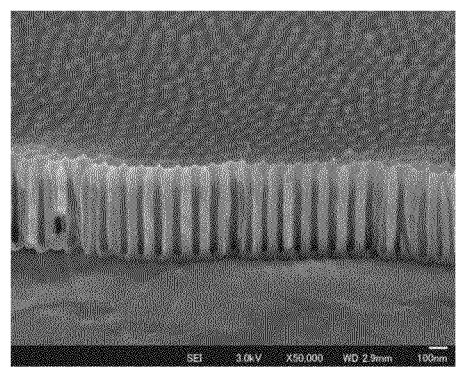
FIG. 6 is a scanning electron microscopic image of a mold surface after the immersion test in Example 1.

Furthermore, a scanning electron microscopic image of the mold after the immersion test is illustrated in FIG. 6.

Meanwhile, a liquid mixture was produced by dissolving 3 parts by mass of the mold dissolving component in 100 parts by mass of the liquid mixture of the polymerizable compound, and the transmittance of the solution was measured using U-3300 (manufactured by Hitachi, Ltd.).

<Manufacturing of the Light Transmissive Film>

A light transmissive film was manufactured in the following manner using a manufacturing apparatus illustrated in FIG. 4.

The previously produced mold was used as the roll-shaped mold 20.

An acrylic film ("AKURIPUREN HBS010" manufactured by Mitsubishi Rayon Co., Ltd., thickness: 100 μm) was used as the base material film 42, and an adhesive-coated PET film ("SAT-116T" manufactured by Kaken Sanei Co., Ltd., thickness: 38 μm) was adhered to the rear surface as the supporting film 48.

The curable composition 38 was supplied from the tank 22 between the roll-shaped mold 20 and the strip-shaped base material film 42, which moves along the surface of the roll-shaped mold 20 and is supported from the rear surface side by the strip-shaped supporting film 48.

Subsequently, ultraviolet rays with an integral of light of 800 mJ/cm$^2$ were radiated on the curable composition 38 through the base material film 42 from the supporting film 48 side using the active energy ray-radiating apparatus 28 installed below the roll-shaped mold 20, and the curable composition 38 was cured, thereby forming the cured resin layer 44 having a fine concavo-convex structure transferred to the surface of the roll-shaped mold 20.

The base material film 42 having the cured resin layer 44 formed on the surface was peeled from the roll-shaped mold 20 together with the supporting film 48 using the peeling roll 30, thereby obtaining the light transmissive film 40 supported by the supporting film 48.

As a result, an 8000 m-long light transmissive film could be continuously and stably manufactured.

Meanwhile, the average cycle between the protrusion portions on the obtained light transmissive film was 100 nm, the height of the protrusion portion was 160 nm, the reflection rate at a wavelength of 550 nm was 0.1% or less, and a change with the manufacturing distance (the length of a transparent film) was not observed.

In addition, when the light transmissive film was manufactured as long as 600 meters, the mold surface was analyzed using XPS.

The results are described in Table 1.

Example 2

A curable composition was prepared in the same manner as in Example 1 except that polyoxyethylene alkyl phosphate ester ("MOLD WIZ INT-1856" manufactured by Accelerator, 0.3 parts by mass) was used as the mold dissolving component instead of polyoxyethylene alkyl phosphate ester, which was a phosphate ester compound mainly including phosphate ester, ("NIKKOL TDP-2" manufactured by Nikko Chemicals Co., Ltd., 0.3 parts by mass), and a light transmissive film was manufactured.

The results are described in Table 1.

Figure 7:
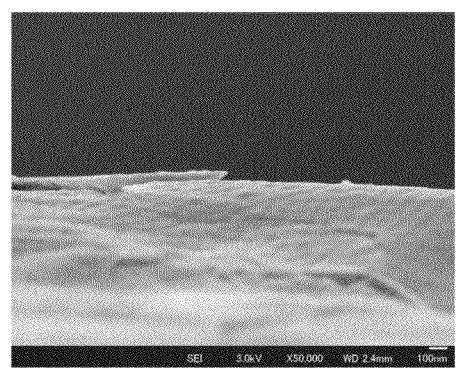
FIG. 7 is a scanning electron microscopic image of a mold surface after the immersion test in Example 2.

In addition, a scanning electron microscopic image of the mold after the immersion test is illustrated in FIG. 7.

A 10000 m-long light transmissive film could be continuously and stably manufactured.

The average interval between the protrusion portions in the vicinity of the 900 meter-point of the obtained light transmissive film was 100 nm, the height of the protrusion portion was 160 nm, and the reflection rate at a wavelength of 550 nm was 0.1%.

The average interval between the protrusion portions in the vicinity of the 2700 meter-point of the obtained light transmissive film was 100 nm, the height of the protrusion portion was 130 nm, and the reflection rate at a wavelength of 550 nm was 0.2%.

The average interval between the protrusion portions in the vicinity of the 4500 meter-point of the obtained light transmissive film was 100 nm, the height of the protrusion portion was 100 nm, and the reflection rate at a wavelength of 550 nm was 0.4%.

The average interval between the protrusion portions in the vicinity of the 6300 meter-point of the obtained light transmissive film was 100 nm, the height of the protrusion portion was 95 nm, and the reflection rate at a wavelength of 550 nm was 0.8%.

The average interval between the protrusion portions in the vicinity of the 7200 meter-point of the obtained light transmissive film was 100 nm, the height of the protrusion portion was 90 nm, and the reflection rate at a wavelength of 550 nm was 1.2%.

The average interval between the protrusion portions in the vicinity of the 10000 meter-point of the obtained light transmissive film was 100 nm, the height of the protrusion portion was 70 nm, and the reflection rate at a wavelength of 550 nm was 2.6%.

Figure 9:
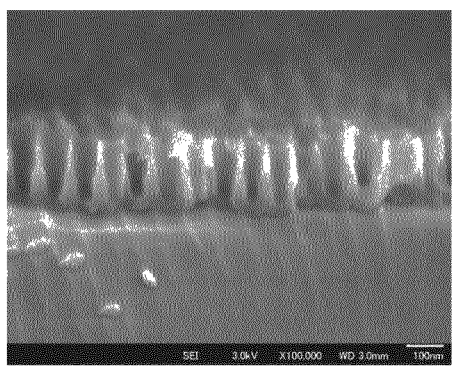
FIG. 9 is a scanning electron microscopic image of a mold surface before manufacturing a light transmissive film in Example 2.
Figure 10:
FIG. 10 is a scanning electron microscopic image of a mold surface after manufacturing a light transmissive film in Example 2.

A scanning electron microscopic image of the mold before the manufacturing of the light transmissive film is illustrated in FIG. 9, and a scanning electron microscopic image of the mold after the manufacturing of the 10000 m-long light transmissive film is illustrated in FIG. 10, respectively.

In addition, as a result of measuring the transmittance of a liquid mixture at 500 nm obtained by dissolving 3 parts by mass of INT-1856 in 100 parts by mass of a liquid mixture of the polymerizable compound, the transmittance is 47%, and it is considered that the compatibility between the internal release agent and the polymerizable compound is poor, and the liquid mixture is easy to bleed out. The atomic percentage of phosphorous atoms on the film surface was obtained using XPS, and was 0.15%.

Therefore, it is considered that favorable release properties could be secured for a long period of time, but the internal release agent had a high mold dissolving property, and bled out a great deal, and therefore the height of the fine concavo-convex structure changed.

Comparative Example 1

A curable composition was prepared in the same manner as in Example 1 except that polyoxyethylene alkyl phosphate ester ("TPL-4" manufactured by Nikko Chemicals Co., Ltd., 0.3 parts by mass) was used as the mold dissolving component instead of polyoxyethylene alkyl phosphate ester, which was a phosphate ester compound mainly including phosphate ester, ("NIKKOL TDP-2" manufactured by Nikko Chemicals Co., Ltd., 0.3 parts by mass), and a light transmissive film was manufactured.

The results are described in Table 1.

Figure 8:
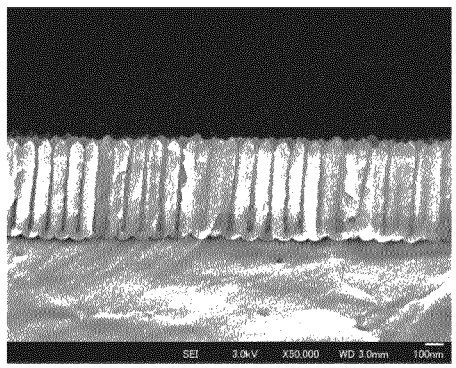
FIG. 8 is a scanning electron microscopic image of a mold surface after the immersion test in Comparative Example 1.

In addition, a scanning electron microscopic image of the mold after the immersion test is illustrated in FIG. 8.

TABLE 1

|  |  |  | Example 1 | Example 2 | Comparative Example 1 |
|---|---|---|---|---|---|
| Composition of curable composition (parts by mass) | Polymerizable compound | ARONIX M260 | 20 | 20 | 20 |
|  |  | TAS | 70 | 70 | 70 |
|  |  | Hydroxyethyl acrylate | 3 | 3 | 3 |
|  |  | Methyl acrylate | 7 | 7 | 7 |
|  | Polymerization initiator | IRGACURE184 | 1.0 | 1.0 | 1.0 |
|  |  | IRGACURE819 | 0.1 | 0.1 | 0.1 |
|  | Mold dissolving component (including phosphoric acid) | NIKKOL TDP-2 | 0.3 | — | — |
|  |  | MOLD WIZ INT-1856 | — | 0.3 | — |
|  |  | NIKKOL TLP-4 | — | — | 0.3 |
|  | Ultraviolet ray absorbent | Viosorb 110 | 0.2 | 0.2 | 0.2 |
| Content of mold dissolving component in 100 mass % of curable composition |  |  | 0.295 | 0.295 | 0.295 |
| pH of aqueous solution |  |  | 3.8 | 2.5 | 7.1 |
| Concentration of phosphoric acid in aqueous solution (ppm) |  |  | 1.9 | 130 | 12 |
| Content of phosphoric acid in curable composition [the concentration of phosphoric acid in aqueous solution × the content of mold dissolving component] |  |  | 0.6 | 38.4 | 3.5 |
| Evaluation | Mold solubility [reduction rate (mass %)] |  | 0.01 | 0.4 | 0 |
|  | XPS analysis | P/Al atomic percentage | 0.24 | 0.27 | 0.31 |
|  |  | Presence of detection of Na | No | No | Yes |

As is evident from Table 1, in the case of Example 1, the reduction rate of the mass of the mold by the immersion test was 0.01%.

In addition, as is evident from FIGS. 5 and 6, the diameters of the fine pores in the mold slightly enlarged after the immersion test (FIG. 6) compared to before the immersion test (FIG. 5).

The above results indicated that the mold surface was extremely slightly dissolved by the phosphate ester compound including phosphoric acid, which was the mold dissolving component included in the curable composition of Example 1.

In addition, as a result of analyzing the mold surface using XPS when the light transmissive film was manufactured as long as 600 meters, the P/Al atomic percentage was small compared to Comparative Example 1, and the deposition of the phosphate ester compound including phosphoric acid was suppressed.

That is, in Example 1, the contamination of the mold surface could be prevented.

Meanwhile, in the case of Example 2, the reduction rate of the mass of the mold by the immersion test was 0.4%.

In addition, as is evident from FIGS. 5 and 7, the fine pores in the mold disappeared after the immersion test (FIG. 7) compared to before the immersion test (FIG. 5).

The above results indicated that the phosphate ester compound including phosphoric acid in the mold dissolving component included in the curable composition of Example 2 had an overly strong dissolving property with respect to the mold, and the mold was excessively dissolved.

The above fact is also evident from FIGS. 9 and 10.

That is, the fine concavo-convex structure in the mold after the manufacturing of a 10000 m-long light transmissive film (FIG. 10) changed compared to before the manufacturing the light transmissive film (FIG. 9).

This is considered to be because the mold was dissolved by the phosphate ester compound including phosphoric acid.

In the case of Comparative Example 1, the reduction rate of the mass of the mold by the immersion test was 0%, and the mass did not change.

In addition, as is evident from FIGS. 5 and 8, a change in the fine pores in the mold after the immersion test (FIG. 8) was not confirmed compared to before the immersion test (FIG. 5).

The above results indicated that the phosphate ester compound including phosphoric acid, which was the mold dissolving component included in the curable composition of Comparative Example 1, had a poor dissolving property with respect to the mold.

In addition, as a result of analyzing the mold surface using XPS when the light transmissive film was manufactured as long as 600 meters, Na was detected.

In addition, the P/Al atomic percentage was high compared to Example 1.

That is, it was determined that the phosphate ester compound including phosphoric acid was deposited on the mold surface and the mold surface was contaminated, and the manufacturing of the light transmissive film was stopped.

Example 3

Preparation of the Curable Composition

A condensation reactant of trimethylolethane/acrylic acid/succinic anhydride ("TAS" manufactured by Osaka Organic Chemical Industry Co., Ltd., 45 parts by mass) as the polymerizable compound, 1,6-hexanediol diacrylate (manufactured by Osaka Organic Chemical Industry Co., Ltd., 45 parts by mass), and a radical polymerizable silicone oil ("X-22-1602" manufactured by Shin-Etsu Chemical Co., Ltd., 10 parts by mass) were mixed, thereby preparing a liquid mixture.

To the above liquid mixture, 1-hydroxycyclohexyl-phenyl ketone ("IRGACURE184" manufactured by Ciba Specialty Chemicals Co., Ltd., 3 parts by mass) as the polymerization initiator and polyoxyethylene alkyl phosphate ester, which was a phosphate ester compound mainly including phosphoric acid, ("INT-1856" manufactured by Accelerator, 0.5 parts by mass) as the mold dissolving component were added and mixed, and a curable composition was prepared.

As a result of measuring the reduction rate by the mold dissolution for the phosphate ester compound including phosphoric acid used for the curable composition was 0.41%.

<Manufacturing of the Light Transmissive Film>

A light transmissive film was obtained in the same manner as in Example 1. As a result, a 5000 m-long light transmissive film could be continuously and stably manufactured.

In addition, as a result of measuring the transmittance of a liquid mixture at 500 nm obtained by dissolving 3 parts by mass of INT-1856 in 100 parts by mass of a liquid mixture of the polymerizable compound, the transmittance is 95%, and, as a result of carrying out an analysis using XPS at an arbitrary place on the obtained light transmissive film, the atomic percentage of phosphorous atoms on the surface of the light transmissive film was 0.06%, and a change with the manufacturing amount (the length of the light transmissive film) was not observed.

Therefore, favorable release properties could be secured for a long period of time. It is considered that, while the phosphate ester compound including phosphoric acid had a strong mold dissolving property, the amount of bleeding out was suppressed, and therefore the height of the fine concavo-convex structure did not change.

Meanwhile, the average cycle between the protrusion portions on the light transmissive film was 100 nm, and the height of the protrusion portion was 160 nm.

For the obtained light transmissive film, the antireflection properties were evaluated. The results are described in Table 2.

Example 4

A curable composition was prepared in the same manner as in Example 3 except that the addition amount of polyoxyethylene alkyl phosphate ester ("INT-1856" manufactured by Accelerator), which was the phosphate ester compound mainly including phosphoric acid, was set to 0.1 parts by mass, and a light transmissive film was manufactured using the curable composition.

As a result, a 10000 m-long light transmissive film could be continuously and stably manufactured.

In addition, as a result of carrying out an analysis using XPS at an arbitrary place on the obtained light transmissive film, the atomic percentage of phosphorous atoms on the surface of the light transmissive film was 0.01%, and a change with the manufacturing amount (the length of the light transmissive film) was not observed.

Meanwhile, the average cycle between the protrusion portions on the light transmissive film was 100 nm, and the height of the protrusion portion was 160 nm.

For the obtained light transmissive film, the antireflection properties were evaluated. The results are described in Table 2.

Example 5

A curable composition was prepared in the same manner as in Example 3 except that the addition amount of polyoxyethylene alkyl phosphate ester ("INT-1856" manufactured by Accelerator), which was the phosphate ester compound mainly including phosphoric acid, was set to 0.03 parts by mass, and a light transmissive film was manufactured using the curable composition.

As a result, a 5000 m-long light transmissive film could be continuously and stably manufactured.

In addition, as a result of measuring the transmittance of a liquid mixture at 500 nm obtained by dissolving 3 parts by mass of INT-1856 in 100 parts by mass of a liquid mixture of the polymerizable compound, the transmittance is 95%, and, as a result of carrying out an analysis using XPS at an arbitrary place on the obtained light transmissive film, the atomic percentage of phosphorous atoms on the surface of the light transmissive film was 0.004%, and a change with the manufacturing amount (the length of the light transmissive film) was not observed.

Meanwhile, the average cycle between the protrusion portions on the light transmissive film was 100 nm, and the height of the protrusion portion was 160 nm.

For the obtained light transmissive film, the antireflection properties were evaluated. The results are described in Table 2.

Comparative Example 2

A curable composition was prepared in the same manner as in Example 3 except that the mold dissolving component (the phosphate ester compound including phosphoric acid) was not included, and a light transmissive film was manufactured using the curable composition.

TABLE 2

| | | | Example 3 | Example 4 | Example 5 | Comparative Example 2 |
|---|---|---|---|---|---|---|
| Composition of curable composition (parts by mass) | Polymerizable compound | TAS | 45 | 45 | 45 | 45 |
| | | 1,6-hexadiol diacrylate | 45 | 45 | 45 | 45 |
| | | x-22-1602 | 10 | 10 | 10 | 10 |
| | | ARONIX M260 | 0 | 0 | 0 | 0 |
| | | Hydroxyethyl acrylate | 0 | 0 | 0 | 0 |
| | | Methyl acrylate | 0 | 0 | 0 | 0 |
| | Polymerization initiator | IRGACURE184 | 3 | 3 | 3 | 3 |
| | Phosphate ester compound (including phosphoric acid) | INT-1856 | 0.5 | 0.1 | 0.03 | 0 |
| Reduction rate of phosphate ester compound due to dissolution of mold | | | 0.41 | 0.41 | 0.41 | — |
| Atomic percentage of phosphorous atoms using XPS (%) | | | 0.06 | 0.01 | 0.004 | — |
| Evaluation of antireflection properties [reflection rate (%)] | | | ≤0.1 | ≤0.1 | ≤0.1 | — |

As is evident from Table 2, for the light transmissive films obtained in Examples 3 to 5, the reflection rates at a wavelength of 550 nm were 0.1% or less, changes with the manufacturing amount (the length of the light transmissive film) were not observed, and the antireflection properties were excellent even when the light transmissive films were continuously produced.

This is considered to be because the phosphate ester compound including phosphoric acid in the curable composition extremely slightly dissolved the mold surface during transferring, and therefore the mold surface was renewed at all times, and the deposition of an attachment on the mold surface and the contamination of the mold surface were prevented. Furthermore, it is considered to be because the phosphate ester compound including phosphoric acid excessively bled out in a stage in which the curable composition was cured, and therefore it was possible to suppress the excessive dissolution of the mold surface and a significant change in the fine concavo-convex structure on the mold surface even when the phosphate ester compound including phosphoric acid, which had a strong mold dissolving property, was used while the phosphate ester compound including phosphoric acid sufficiently functioned as an internal release agent.

Meanwhile, in Comparative Example 2, when the film was manufactured as long as 200 meters, some of the resin, which was the cured curable resin composition, was not peeled from the mold, and then the light transmissive film could not be stably manufactured.

Test Examples 1 to 7

Table 3 describes the following (a) to (c) of the phosphate ester compound including phosphoric acid and the concentration of phosphoric acid in the aqueous solution.

(a) The reduction rate of the mass of the mold when the mold is immersed in the phosphate ester compound including phosphoric acid at 50° C. for 22 hours (b) The pH of an aqueous solution obtained by extracting the phosphate ester compound including phosphoric acid using 50 mL of water per gram thereof at 25° C.

(c) The value represented by (the concentration of phosphoric acid in the aqueous solution expressed by parts per million parts by mass)×(the content of the mold dissolving component in the active energy ray-curable composition expressed by mass percentage; here the content was set to 0.3).

in terms of antireflection properties even in a case in which the light transmissive film is continuously produced.

REFERENCE SIGNS LIST

14 OXIDE FILM
20 ROLL-SHAPED MOLD
38 ACTIVE ENERGY RAY-CURABLE COMPOSITION
40 LIGHT TRANSMISSIVE FILM
42 BASE MATERIAL FILM
44 CURED RESIN LAYER

The invention claimed is:

1. A method for manufacturing a light transmissive film in which a cured resin layer having a fine concavo-convex structure is formed on a surface of a base material film, comprising:
a step of sandwiching an active energy ray-curable composition including a mold dissolving component between a mold having an inversion structure of the fine concavo-convex structure and the base material film;
a step of obtaining a light transmissive film in which a cured resin layer having the inversion structure of the mold transferred thereto, is formed on one surface of the base material film; and
a step of separating the obtained light transmissive film and the mold,
wherein the mold dissolving component is a phosphate ester compound which includes phosphoric acid and satisfies the following condition (a):
condition (a): after an aluminum prototype of 50 mm×50 mm×0.3 mm, which is an aluminum based metal prepared by a fabric grinding treatment followed by electrolytic-grinding in a solution mixture of perchloric acid/ethanol (volume ratio=1:4) and mirror-polishing on a rolling trace-free cylindrical aluminum prototype of a diameter of 200 mm and a length of 350 mm having an

TABLE 3

| Test example | Phosphate ester compound | (a) Mold mass reduction rate (%) | (b) pH of aqueous solution | (c) (Concentration of phosphoric acid in aqueous solution) × (content of mold dissolving component) | Concentration of phosphoric acid in aqueous solution (ppm) |
|---|---|---|---|---|---|
| 1 | INT1856 | 0.41 | 2.5 | 39.0 | 130 |
| 2 | TDP2 | 0.01 | 3.8 | 0.6 | 1.9 |
| 3 | TDP6 | 0.01 | 3.7 | 1.5 | 5 |
| 4 | TDP8 | 0.01 | 3.5 | 2.7 | 9 |
| 5 | TLP4 | 0.00 | 7.1 | 3.6 | 12 |
| 6 | JP506H | 0.41 | 1.5 | 24.0 | 80 |
| 7 | INT-AM121 | 0.03 | 4.8 | 2.3 | 7.6 |

INDUSTRIAL APPLICABILITY

According to the method for manufacturing a light transmissive film, which is the first aspect of the invention, it is possible to productively manufacture a light transmissive film, and to prevent the deposition of an attachment on the mold surface and the contamination of the mold surface. Therefore, it is possible to manufacture a light transmissive film having excellent performances, such as antireflection properties.

According to the active energy ray-curable composition, which is the second aspect of the invention, it is possible to prevent the contamination of the mold surface and to maintain the release property between the mold and the cured resin layer for a long period of time.

According to the light transmissive film, which is the third aspect of the invention, the light transmissive film is excellent average crystal grain diameter of 40 μm, which was prepared by a forging treatment on an aluminum ingot having a purity of 99.9%, is anodized in a 0.3 M oxalic acid aqueous solution for 30 minutes under conditions of a direct current of 40 V and a temperature of 16° C., the aluminum prototype having a 3 μm-thick oxide film formed thereon is immersed in a 6 mass % phosphoric acid/1.8 mass % chromic acid mixture aqueous solution for 2 hours, thereby removing the oxide film, and then the aluminum prototype is anodized in a 0.3 M oxalic acid aqueous solution for 30 seconds under conditions of a direct current of 40 V and a temperature of 16° C., and when the obtained aluminum prototype is immersed in the mold dissolving component at 50° C. for 22 hours, the mass of the aluminum prototype is reduced by 0.001% to 3% compared to before immersion, and a value represented by (the concentration of phosphoric acid in an aqueous solution obtained by extracting the mold dissolving component using 50 mL of water per gram of the mold dissolving component expressed by parts per million parts by mass)×(the content of the mold dissolving component in the active energy ray-curable composition expressed by mass percentage) is in a range of 0.1 to 39.

2. The method for manufacturing a light transmissive film according to claim 1,
wherein the mold dissolving component is a phosphate ester compound which includes phosphoric acid and which satisfies the following condition (b-1):
condition (b-1): a pH of an aqueous solution obtained by extracting the mold dissolving component using 50 mL of water per gram of the mold dissolving component thereof is less than 6.5 at 25° C.

3. The method for manufacturing a light transmissive film according to claim 1,
wherein the phosphate ester compound is a polyoxyethylene alkyl phosphate ester compound represented by the following formula (1):

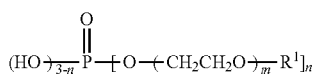
(1)

wherein $R^1$ represents an alkyl group, m represents an integer of 1 to 20, and n represents an integer of 1 to 3.

4. The method for manufacturing a light transmissive film according to claim 1,
wherein the inversion structure of the fine concavo-convex structure on the mold surface is formed from anodized alumina.

5. The method for manufacturing a light transmissive film according to claim 1,
wherein the mold dissolving component is a phosphate ester compound which includes phosphoric acid and which satisfies the following conditions (b-2) and (c-2):
condition (b-2): a pH of an aqueous solution obtained by extracting the mold dissolving component using 50 mL of water per gram of the mold dissolving component thereof is 2.6 or more at 25° C.;
condition (c-2): a value represented by (the concentration of phosphoric acid in an aqueous solution obtained by extracting the mold dissolving component using 50 mL of water per gram of the mold dissolving component expressed by parts per million parts by mass)×(the content of the mold dissolving component in the active energy ray-curable composition expressed by mass percentage) is 23 or less.

6. An active energy ray-curable composition comprising a mold dissolving component,
wherein the mold dissolving component is a phosphate ester compound which includes phosphoric acid and which satisfies the following condition (a):
condition (a): after an aluminum prototype of 50 mm×50 mm×0.3 mm, which is an aluminum based metal prepared by a fabric grinding treatment followed by electrolytic-grinding in a solution mixture of perchloric acid/ethanol (volume ratio=1:4) and mirror-polishing on a rolling trace-free cylindrical aluminum prototype of a diameter of 200 mm and a length of 350 mm having an average crystal grain diameter of 40 μm, which was prepared by a forging treatment on an aluminum ingot having a purity of 99.9%, is anodized in a 0.3 M oxalic acid aqueous solution for 30 minutes under conditions of a direct current of 40 V and a temperature of 16° C., the aluminum prototype having a 3 μm-thick oxide film formed thereon is immersed in a 6 mass % phosphoric acid/1.8 mass % chromic acid mixture aqueous solution for 2 hours, thereby removing the oxide film, and then the aluminum prototype is anodized in a 0.3 M oxalic acid aqueous solution for 30 seconds under conditions of a direct current of 40 V and a temperature of 16° C., and when the obtained aluminum prototype is immersed in the mold dissolving component at 50° C. for 22 hours, the mass of the aluminum prototype is reduced by 0.001% to 3% compared to before immersion, and
a value represented by (the concentration of phosphoric acid in an aqueous solution obtained by extracting the mold dissolving component using 50 mL of water per gram of the mold dissolving component expressed by parts per million parts by mass)×(the content of the mold dissolving component in the active energy ray-curable composition expressed by mass percentage) is in a range of 0.1 to 39.

7. The active energy ray-curable composition according to claim 6,
wherein the mold dissolving component is a phosphate ester compound which includes phosphoric acid and which satisfies the following condition (b-1):
condition (b-1): a pH of an aqueous solution obtained by extracting the mold dissolving component using 50 mL of water per gram of the mold dissolving component thereof is less than 6.5 at 25° C.

8. The active energy ray-curable composition according to claim 6,
wherein the phosphate ester compound is a polyoxyethylene alkyl phosphate ester compound represented by the following formula (1):

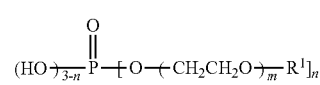
(1)

wherein $R^1$ represents an alkyl group, m represents an integer of 1 to 20, and n represents an integer of 1 to 3.

9. The active energy ray-curable composition according to claim 6,
wherein the mold dissolving component is a phosphate ester compound which includes phosphoric acid and which satisfies the following conditions (b-2) and (c-2):
condition (b-2): a pH of an aqueous solution obtained by extracting the mold dissolving component using 50 mL of water per gram of the mold dissolving component thereof is 2.6 or more at 25° C.;
condition (c-2): a value represented by (the concentration of phosphoric acid in an aqueous solution obtained by extracting the mold dissolving component using 50 mL of water per gram of the mold dissolving component expressed by parts per million parts by mass)×(the content of the mold dissolving component in the active energy ray-curable composition expressed by mass percentage) is 23 or less.

10. The active energy ray-curable composition according to claim 6,
wherein a transmittance at 500 nm is 50% to 100% when 3 parts by mass of the mold dissolving component is dissolved in 100 parts by mass of a polymerizable compound in the active energy ray-curable composition.

11. The active energy ray-curable composition according to claim 6,
wherein the content of the mold dissolving component is 0.01 parts by mass to 3 parts by mass with respect to 100 parts by mass of a polymerizable compound contained in the active energy ray-curable composition.

* * * * *